US012105677B2

(12) United States Patent
Koorapati et al.

(10) Patent No.: US 12,105,677 B2
(45) Date of Patent: Oct. 1, 2024

(54) PER-NODE METADATA FOR CUSTOM NODE BEHAVIORS ACROSS PLATFORMS

(71) Applicant: Dropbox, Inc., San Francisco, CA (US)

(72) Inventors: Nipunn Koorapati, San Francisco, CA (US); Pranav Vishnu Ramabhadran, San Francisco, CA (US); Gautam Gupta, San Francisco, CA (US); Adam Arbree, Fairfax, CA (US); Michael Nilsson, Glen Cove, NY (US); Parker Timmerman, Jersey City, NJ (US); Stanimir Pehlivanov, San Francisco, CA (US); Sourabh Yerfule, Sunnyvale, CA (US); Yuyang Guo, Mountain View, CA (US); Bryan Guillemette, Palo Alto, CA (US); Zihao Yang, San Francisco, CA (US); Rishabh Jain, San Francisco, CA (US); Jonathan Chien, San Francisco, CA (US); Royce Ausburn, Mountain View, CA (US); David Aeschlimann, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 194 days.

(21) Appl. No.: 17/121,381

(22) Filed: Dec. 14, 2020

(65) Prior Publication Data

US 2022/0188273 A1 Jun. 16, 2022

(51) Int. Cl.
*G06F 16/178* (2019.01)
*G06F 16/13* (2019.01)
(Continued)

(52) U.S. Cl.
CPC .......... *G06F 16/178* (2019.01); *G06F 16/13* (2019.01); *G06F 16/168* (2019.01); *G06F 21/629* (2013.01); *H04L 67/1097* (2013.01)

(58) Field of Classification Search
CPC ...... G06F 16/178; G06F 16/168; G06F 16/13; G06F 21/629; H04L 67/1097
(Continued)

(56) References Cited

U.S. PATENT DOCUMENTS 10,474,635 B1 * 11/2019 Unger ................. G06F 11/3457
2010/0262928 A1 * 10/2010 Abbott ................. G06F 3/0486
345/173
(Continued)

FOREIGN PATENT DOCUMENTS

AU 2011203185 A1 * 7/2011 ............ G06F 16/116
CN 111176615 A * 5/2020
(Continued)

OTHER PUBLICATIONS

McDaniel et al., "Content based file type detection algorithms," 36th Annual Hawaii International Conference on System Sciences, 2003. Proceedings of the, 2003, pp. 10 pp. -, doi: 10.1109/HICSS.2003.1174905. (Year: 2003).*
(Continued)

*Primary Examiner* — Peter C Shaw
(74) *Attorney, Agent, or Firm* — Polsinelli PC

(57) ABSTRACT

Technologies for implementing customized behaviors for content items are provided. An example method can include receiving, from a user account registered with a content management system, a request to access a content item managed by the content management system for the user account, the content item having one or more behaviors configured for an attribute associated with the content item and/or the content item associated with the attribute; obtaining, from a representation of a remote state of content items associated with the user account, metadata defining the attribute associated with the content item; based on the metadata, determining the one or more behaviors configured
(Continued)

for the attribute and/or the content item associated with the attribute; and applying the one or more behaviors to the content item.

19 Claims, 13 Drawing Sheets

(51) Int. Cl.
    *G06F 16/16*     (2019.01)
    *G06F 21/62*     (2013.01)
    *H04L 67/1097*     (2022.01)

(58) Field of Classification Search
    USPC .......................................................... 726/27
    See application file for complete search history.

(56) References Cited

U.S. PATENT DOCUMENTS

| | | | |
|---|---|---|---|
| 2012/0030182 A1* | 2/2012 | Claman | G11B 27/034 707/690 |
| 2013/0191806 A1* | 7/2013 | Sugaya | H01L 25/50 716/136 |
| 2013/0191896 A1* | 7/2013 | Adderly | H04W 4/80 709/204 |
| 2014/0181438 A1* | 6/2014 | Varadharajan | G06F 11/2094 711/162 |
| 2014/0188804 A1* | 7/2014 | Gokhale | G06F 21/6218 707/645 |
| 2014/0297695 A1 | 10/2014 | DeJana et al. | |
| 2015/0378540 A1 | 12/2015 | Bimson et al. | |
| 2017/0039379 A1* | 2/2017 | Skipper | H04L 63/20 |
| 2017/0083519 A1 | 3/2017 | Huang et al. | |
| 2017/0147245 A1 | 5/2017 | Safa | |
| 2018/0147245 A1* | 5/2018 | O'Shea | C12N 15/86 |
| 2018/0173390 A1 | 6/2018 | Dunne et al. | |
| 2018/0173786 A1* | 6/2018 | Dev | G06F 9/44505 |
| 2018/0330724 A1 | 11/2018 | Miller et al. | |
| 2019/0018953 A1 | 1/2019 | Totale et al. | |
| 2019/0051296 A1* | 2/2019 | Echols | G06F 3/167 |
| 2019/0205456 A1* | 7/2019 | Lai | H04L 63/08 |
| 2019/0227985 A1 | 7/2019 | Mohen et al. | |
| 2020/0125450 A1* | 4/2020 | Aron | G06F 16/13 |
| 2020/0210383 A1 | 7/2020 | Demaris et al. | |
| 2020/0220928 A1 | 7/2020 | Karande et al. | |
| 2021/0232992 A1* | 7/2021 | Disterheft | G06Q 10/0633 |
| 2021/0271348 A1* | 9/2021 | Wurzer | G06F 3/03547 |

FOREIGN PATENT DOCUMENTS

| | | | | |
|---|---|---|---|---|
| EP | 3076327 A1 * | 10/2016 | | G06F 21/56 |
| JP | 2009258824 A * | 11/2009 | | |
| WO | WO-2015042494 A2 * | 3/2015 | | G06Q 40/04 |

OTHER PUBLICATIONS

Zhao et al., "A user-level secure grid file system," SC '07: Proceedings of the 2007 ACM/IEEE Conference on Supercomputing, 2007, pp. 1-11, doi: 10.1145/1362622.1362683. (Year: 2007).*

Graf et al., "A capability-based transparent cryptographic file system," 2005 International Conference on Cyberworlds (CW'05), 2005, pp. 8 pp. -108, doi: 10.1109/CW.2005.1. (Year: 2005).*

Amirani et al., "A new approach to content-based file type detection," 2008 IEEE Symposium on Computers and Communications, 2008, pp. 1103-1108, doi: 10.1109/ISCC.2008.4625611. (Year: 2008).*

Dhanalakshmi et al., "File format identification and information extraction," 2009 World Congress on Nature & Biologically Inspired Computing (NaBIC), 2009, pp. 1497-1501, doi: 10.1109/NABIC.2009.5393688. (Year: 2009).*

Xu et al., "Building A Fast and Efficient LSM-tree Store by Integrating Local Storage with Cloud Storage," 2021 IEEE International Conference on Cluster Computing (CLUSTER), Portland, OR, USA, 2021, pp. 125-134, doi: 10.1109/Cluster48925.2021.00032. (Year: 2021).*

Marchant et al., "Managing Event Oriented Workflows," 2020 IEEE/ACM 2nd Annual Workshop on Extreme-scale Experiment-in-the-Loop Computing (XLOOP), GA, USA, 2020, pp. 23-28, doi: 10.1109/XLOOP51963.2020.00009. (Year: 2020).*

Kreibich et al., "Policy-controlled event management for distributed intrusion detection," 25th IEEE International Conference on Distributed Computing Systems Workshops, Columbus, OH, USA, 2005, pp. 385-391, doi: 10.1109/ICDCSW.2005.112. (Year: 2005).*

Loganathan et al., "An Extensive Web Security Through Cloud Based Double Layer Password Encryption (DLPE) Algorithm for Secured Management Systems," Puducherry, India, 2021, pp. 1-6, doi: 10.1109/ICSCAN53069.2021 (Year: 2021).*

Kumar et al., "A Data Security-based Efficient Compression and Encryption for Cloud Computing," 2023 7th International Conference on Trends in Electronics and Informatics (ICOEI), Tirunelveli, India, 2023, pp. 647-653, doi: 10.1109/ICOEI56765.2023.10125686. (Year: 2023).*

Monday et al., "Ensuring Data Governace and Enhancing Data Security in a Private Cloud Environment," 2018 IEEE 9th Annual Information Technology, Electronics and Mobile Communication Conference (IEMCON), Vancouver, BC, Canada, 2018, pp. 1018-1024, doi: 10.1109/IEMCON.2018.8615066. (Year: 2018).*

Suwansrikhan et al., "Asymmetric Secure Storage Scheme for Big Data on Multiple Cloud Providers," 2018 4th IEEE International Conference on Big Data Security on Cloud, IEEE, DOI: 10.1109/BDS/HPSC/IDS18.2018.00036, 2018. (Year: 2018).*

Yu et al., "An Efficient Multidimension Metadata Index and Search System for Cloud Data," 2014 IEEE 6th International Conference on Cloud Computing Technology and Science, Singapore, 2014, pp. 499-504, doi: 10.1109/CloudCom.2014.88. (Year: 2014).*

Plangprasopchok et al., "Growing a Tree in the Forest: Constructing Folksonomies by Integrating Structured Metadata," arXiv: 1005.5114, May 27, 2010. (Year: 2010).*

Nguyen et al., "Metadata integration framework for managing forest heterogeneous information resources," Proceedings. 15th International Workshop on Database and Expert Systems Applications, 2004., Zaragoza, Spain, 2004, pp. 586-591, doi: 10.1109/DEXA.2004.1333538. (Year: 2004).*

Xiuzhen et al., "A study on tree matching model and algorithm towards metadata," 2010 2nd IEEE International Conference on Information Management and Engineering, Chengdu, China, 2010, pp. 259-262, doi: 10.1109/ICIME.2010.5477842. (Year: 2010).*

* cited by examiner

PER-NODE METADATA FOR CUSTOM NODE BEHAVIORS ACROSS PLATFORMS

TECHNICAL FIELD

The present technology pertains to implementing custom node behaviors across different computing platforms.

BACKGROUND

Content management systems allow users to store and access data on the cloud. A content management system can allow users to maintain a variety of content items stored in a centralized manner and accessible from any client device. Content management systems can support various types of content items and content functionalities. For example, some content management systems allow users to share data with other users and access the data in a collaborative fashion. Moreover, some content management systems may support synchronization of copies of data across a number of client devices. The synchronization functionality can enable users to store local copies of the data on their client devices and access the local copies of the data from their client devices. The local copies of the data can be synchronized with the data on the content management systems to ensure consistency between local and cloud copies of the data. The local copies of the data may provide users with faster access to the data and may allow users to access the data when their client devices are offline.

The different types of content items can also support predefined content behaviors. For example, generally, a content item behaves in a particular way when the content item is accessed. However, the particular behavior of the content item is limited or constrained by the type of content item, the file extension of the content item and the software application used to access the content item. The software application used to access the content item often depends on the file extension of the content item, as each software application typically supports only a limited number of file extensions. Moreover, the constraints imposed by the types of content items, the file extensions, and the associated software applications can also limit or complicate the ability of a content management system to provide or support certain functionalities for content items.

BRIEF DESCRIPTION OF THE DRAWINGS

The disclosed and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
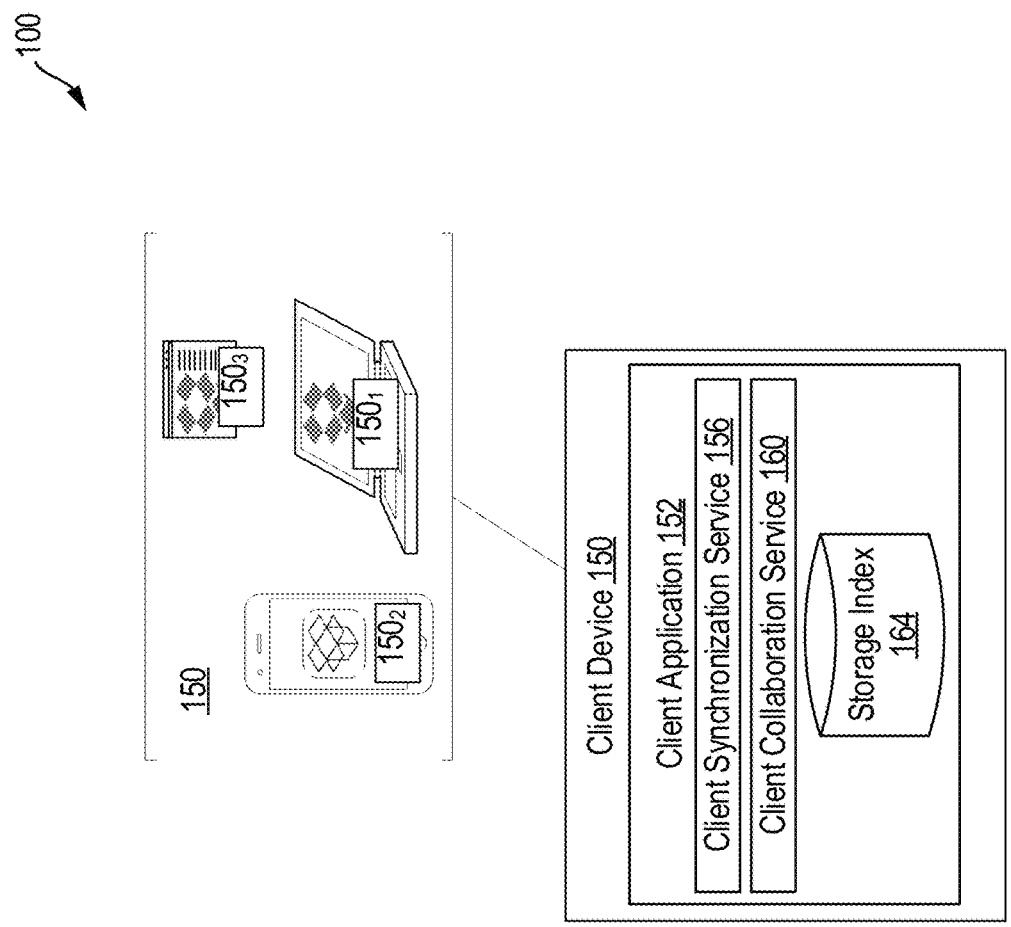
FIG. 1A shows an example configuration of a computing environment including a content management system and client devices, according to some examples.
Figure 1A:
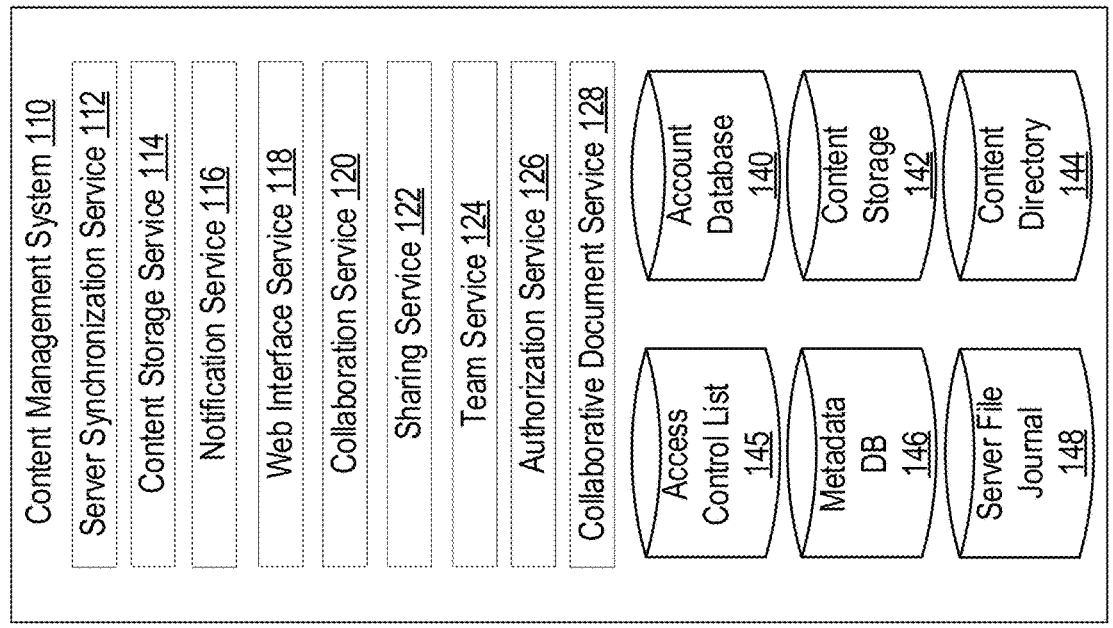

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

In some examples, a content management system can allow users to store and access content items across multiple devices. The content items may include, for example and without limitation, various types of files, documents, messages (e.g., email messages, text messages, etc.), media files (e.g., photos, videos, audio files), folders, news feeds, and/or any other type of data or content. The content items on the content management system can be shared with multiple users, edited, deleted, added, renamed, moved, opened and/or otherwise accessed or manipulated. The content management system can also support a variety of other content and collaboration functionalities, such as synchronization, commenting, and rendering, among others.

A content item can behave in a particular way when the content item is accessed and/or processed. The behavior of a content item can often depend on various factors such as, for example, the type of content item and the software application used to access the content item. For example, in some cases, the behavior of a file can be at least partly based on the file extension and the software application associated with that file extension. In some cases, constraints imposed by the type of content item, the file extension of the content item, and/or the software application associated with the content item (and/or the file extension) can make it difficult for a content management system to layer or provide additional functionalities for certain content items managed by the content management system.

The technologies disclosed herein can enable content management systems to layer or provide additional functionalities for content items managed by the content management system. For example, the technologies disclosed herein can allow a content management system to support and/or implement custom behaviors for content items. The content management system can support and/or implement custom behaviors that may not be otherwise supported by, or possible with, such content items. In some examples, per-node (e.g., per content item) metadata can be used to specify custom behaviors for nodes (e.g., content items). The per-node metadata can be stored as an attribute(s) of each associated node and can define the custom behavior for that node.

The custom behaviors defined for nodes can be supported and applied across different client devices and computing platforms. For example, the custom behaviors can be supported and applied at mobile platforms, web-based platforms, desktop platforms, different operating systems, etc. Non-limiting examples of custom behaviors can include requiring a password to access a node, defining and/or displaying a specific type of icon for a node, enabling or disabling certain node functionalities (e.g., sharing, renaming, deleting, moving, etc.), enabling or disabling a particular behavior based on a type of interaction with the node (e.g., opening the node, etc.), among others.

In some aspects, the disclosed technologies are implemented in the context of a content management system having content item synchronization capabilities and collaboration features, among others. An example configuration 100 of a content management system and environment is shown in FIG. 1A, which depicts an example content management system 110 interacting with an example client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1A.

In some embodiments, content storage 142 is associated with at least one content storage service 114, which includes software or other processor executable instructions for managing the storage of content items including, but not limited to, receiving content items for storage, preparing content items for storage, selecting a storage location for the content item, retrieving content items from storage, etc. In some embodiments, content storage service 114 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 114 can output a unique ID for each content item.

Content storage service 114 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 114 can define or record a content path for a content item wherein the "root" node of a directory structure can be a namespace for each account. Within the namespace can be a directory structure defined by a user of an account and/or content storage service 114. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 114 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 114 can also store metadata describing content items, content item types, folders, file path, and/or the relationship of content items to various accounts, collections, or groups in metadata database 146, in association with the unique ID of the content item.

Content storage service 114 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 150$_1$ is a computing device having a local file system accessible by multiple applications resident thereon. Client device 150$_2$ is a computing device wherein content items are only accessible to a specific application or by permission given by the specific application, and the content items are typically stored either in an application specific space or in the cloud. Client device 150$_3$ is any client device accessing content management system 110 via a web browser and accessing content items via a web interface. While example client devices 150$_1$, 150$_2$, and 150$_3$ are depicted in form factors such as a laptop, mobile device, or web browser, it should be understood that the descriptions thereof are not limited to devices of these example form factors. For example a mobile device such as client device 150$_2$ might have a local file system accessible by multiple applications resident thereon, or client device 150$_2$ might access content management system 110 via a web browser. As such, the form factor should not be considered limiting when considering client device 150's capabilities. One or more functions described herein with respect to client device 150 may or may not be available on every client device depending on the specific capabilities of the device—the file access model being one such capability.

In some embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 114 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 116. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 122. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 122 to share content within content management system 110 with at least one additional user account (in addition to the original user account associated with the content item) so that each user account has access to the content item. The additional user account can gain access to the content by accepting the content, which will then be accessible through either web interface service 118 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 122 can add a user account identifier or multiple user account identifiers to a content entry in access control list database 145 associated with the content item, thus granting the added user account access to the content item. Sharing service 122 can also remove user account identifiers from a content entry to restrict a user account's access to the content item. Sharing service 122 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 122 can generate a custom network address, such as a uniform resource locator (URL), which allows any web browser to access the content item or collection in content management system 110 without any authentication. To accomplish this, sharing service 122 can include content identification data in the generated URL, which can later be used to properly identify and return the requested content item. For example, sharing service 122 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 122 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 122 can change the value of the flag to 1 or true after generating a URL to the content item.

In some embodiments, sharing service 122 can associate a set of permissions to a URL for a content item. For example, if a user attempts to access the content item via the URL, sharing service 122 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 122 can also be configured to deactivate a generated URL. For example, each content entry can also include a URL active flag indicating whether the content should be returned in response to a request from the generated URL. For example, sharing service 122 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 122 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 124. Team service 124 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 124 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 126. Authorization service 126 ensures that a user account attempting to access a namespace has appropriate rights to access the namespace. Authorization service 126 can receive a token from client application 152 that follows a request to access a namespace and can return the capabilities permitted to the user account. For user accounts with multiple levels of access (e.g. a user account with user rights and administrator rights) authorization service 126 can also require explicit privilege escalation to avoid unintentional actions by administrators.

Presence and Seen State

In some embodiments, content management system 110 can provide information about how users with which a content item is shared are interacting or have interacted with the content item. In some embodiments, content management system 110 can report that a user with which a content item is shared is currently viewing the content item. For example, client collaboration service 160 can notify notifications service 116 when client device 150 is accessing the content item. Notifications service 116 can then notify all client devices of other users having access to the same content item of the presence of the user of client device 150 with respect to the content item.

In some embodiments, content management system 110 can report a history of user interaction with a shared content item. Collaboration service 120 can query data sources such as metadata database 146 and server file journal 148 to determine that a user has saved the content item, that a user has yet to view the content item, etc., and disseminate this status information using notification service 116 to other users so that they can know who currently is or has viewed or modified the content item.

Collaboration service 120 can facilitate comments associated with content, even if a content item does not natively support commenting functionality. Such comments can be stored in metadata database 146.

Collaboration service 120 can originate and transmit notifications for users. For example, a user can mention another user in a comment and collaboration service 120 can send a notification to that user that he has been mentioned in the comment. Various other content item events can trigger notifications, including deleting a content item, sharing a content item, etc.

Collaboration service 120 can provide a messaging platform whereby users can send and receive instant messages, voice calls, emails, etc.

Collaboration Content Items

In some embodiments, content management system 110 can also include collaborative document service 128 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by client application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 118. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application (e.g., client application 152), one or more application plug-ins, and/or a browser extension. However, the user can also interact with content management system 110 via a third-party application, such as a web browser, that resides on client device 150 and is configured to communicate with content management system 110. In various implementations, the client-side application (e.g., client application 152) can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of content management system 110 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While content management system 110 is presented with specific components, it should be understood by one skilled in the art, that the architectural configuration of content management system 110 is simply one possible configuration and that other configurations with more or fewer components are possible.

Figure 1B:
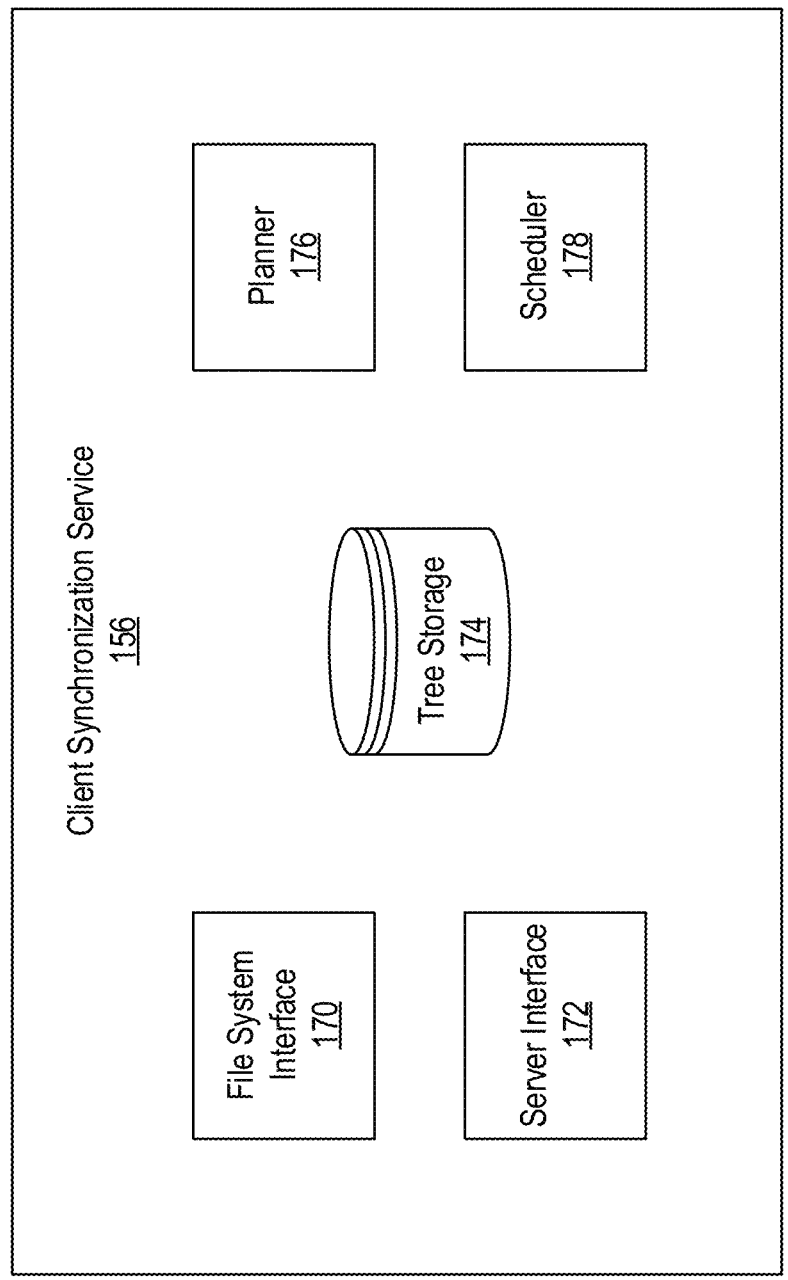
FIG. 1B shows an example of a client synchronization service, in accordance with some examples.

FIG. 1B shows an example of a client synchronization service 156, in accordance with some examples of the present disclosure. In some examples, client synchronization service 156 may be implemented in client device 150 as shown in FIG. 1A. However, in other examples, client synchronization service 156 may be implemented on another computing device(s).

Client synchronization service 156 can be configured to synchronize changes to content items between content management system 110 and client device 150 running client synchronization service 156. Client synchronization service 156 can include file system interface 170, server interface 172, tree storage 174, planner 176, and scheduler 178. Additional and/or alternative components may also be included. High level descriptions of client synchronization service 156 and its components are discussed below with respect to FIG. 1B. However, further details and examples of client synchronization service 156 and its components are discussed throughout.

File system interface 170 can be configured to process changes to content items on the local filesystem of client device 150 and update a local tree stored on tree storage 174. For example, file system interface 170 can be in communication with client synchronization service 156 to detect changes to content items on the local filesystem of client device 150. Changes may also be made and detected via client application 152 shown in FIG. 1A. File system interface 170 can make updates to the local tree. In some examples, updates can be made based on changes to content items (e.g., new content items, deleted content items, modified content items, copied content items, renamed content items, moved content items, etc.) on client device 150.

Server interface 172 can be configured to aid in the processing of remote changes to content items at a remote storage of content management system 110 and the updating of a remote tree stored on tree storage 174. For example, server interface 172 can be in communication with server synchronization service 112 shown in FIG. 1A to synchronize changes to content items between client device 150 and content management system 110. Changes to content items (e.g., new content items, deleted content items, modified content items, copied content items, renamed content items, moved content items, etc.) at content management system 110 can be detected and updates can be made to the remote tree to reflect the changes at content management system 110.

Tree storage 174 can be configured to store and maintain tree data structures used by client synchronization service 156. For example, tree storage 174 can store a local tree, a synchronization tree, and a remote tree, as further described herein. In some examples, tree storage 174 can store the tree data structures in persistent memory (e.g., a hard disk or other secondary storage device), main memory (e.g., RAM or other primary storage device), and/or any other memory, in order to reduce latency and response times. For example, on start-up of client device 150 or client synchronization service 156, the tree data structures may be retrieved from persistent memory and loaded into main memory. Tree storage 174 can access and update the tree data structures on main memory and, before client device 150 or client synchronization service 156 is shut down, tree storage 174 may store the updated tree data structures on persistent memory. In some cases, because main memory can be expensive in cost and often limited in size on most client devices, additional technological improvements can be implemented to decrease the footprint of the tree data structures on main memory.

Planner 176 can be configured to detect differences between the server state at content management system 110 (e.g., the state of content items at content management system 110) and the file system state at client device 150 (e.g., the state of content items at client device 150) based on the state of the tree data structures. For example, planner 176 may determine if there is a difference between the remote tree and the synchronization tree. A difference between the remote tree and the synchronization tree indicates that an action performed remotely on one or more content items stored at content management system 110 has caused the server state and the file system state to become out of sync. Similarly, planner 176 may also determine if there is a difference between the local tree and the synchronization tree. A difference between the local tree and the synchronization tree indicates that an action performed locally on one or more content items stored on client device 150 has caused the server state and the file system state to become out of sync. If a difference is detected, planner 176 can generate a sequence of operations that synchronize the tree data structures.

In some scenarios, a sequence of operations generated based on a difference between the remote tree and the synchronization tree and a sequence of operations generated based on a difference between the local tree and the synchronization tree may conflict. Planner 176 can be configured to merge the two sequences of operations into a single merged plan of operations. For example, planner 176 can reconcile conflicts between the remote tree, the synchronization tree, and the local tree so each tree indicates and/or represents the same sequence of operations.

Scheduler 178 can be configured to take the generated sequence of operations and manage the execution of those operations. In some examples, scheduler 178 can convert each operation in the sequence of operations into a series of one or more tasks that client device 150 can execute to perform an operation(s). In some scenarios, one or more tasks may become outdated or irrelevant. Scheduler 178 can be configured to identify those tasks and cancel them.

Figure 2:
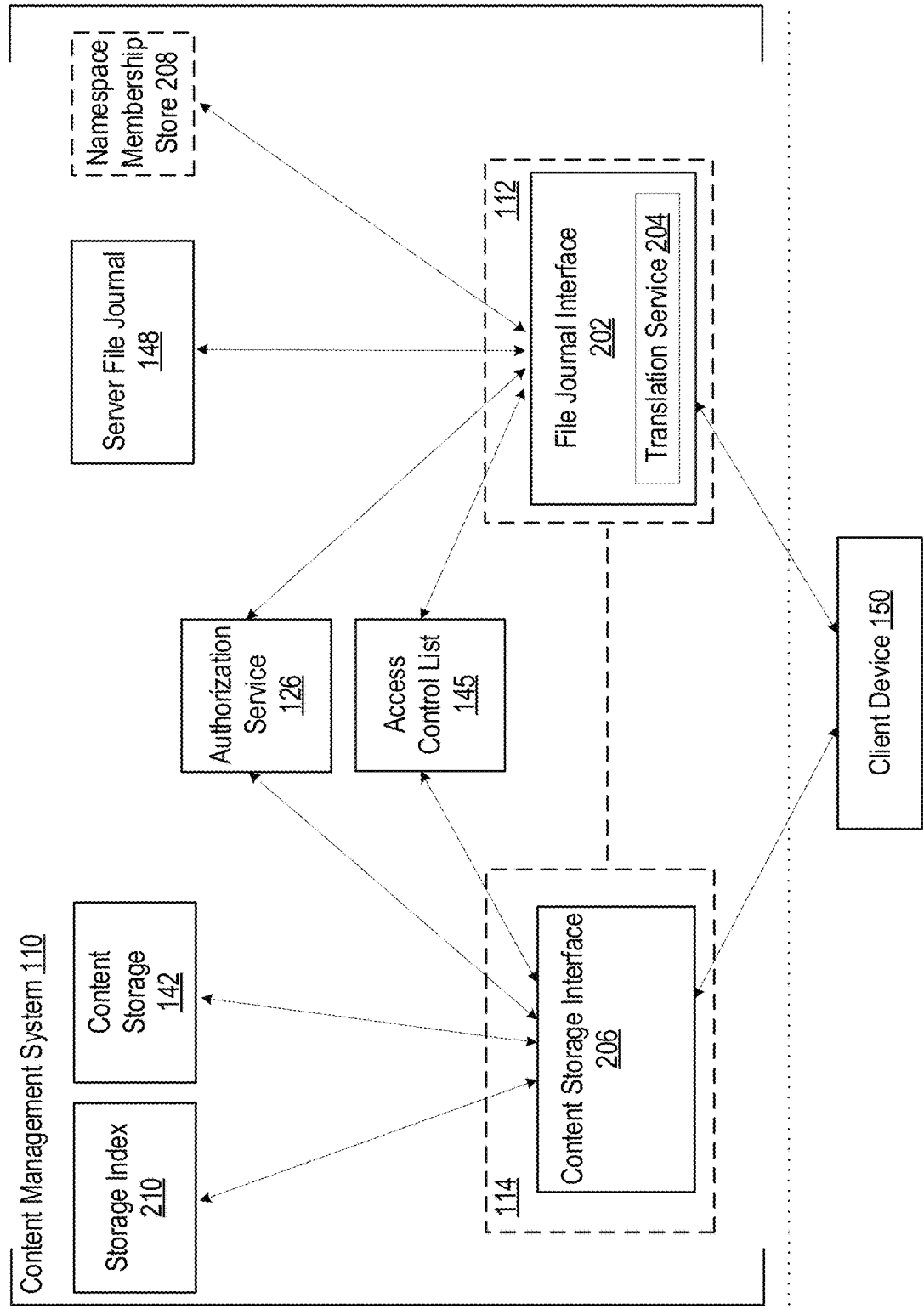
FIG. 2 is a schematic diagram illustrating an example architecture for synchronizing content between a content management system and one or more client devices, in accordance with some examples.

FIG. 2 shows a schematic diagram of an example architecture for synchronizing content between content management system 110 and client device 150. In this example, client device 150 interacts with content storage 142 and server file journal 148 via content storage interface 206 and file journal interface 202, respectively. In some cases, content storage interface 206 can be implemented, provided and/or managed by content storage service 114, and file journal interface 202 can be implemented, provided and/or managed by server synchronization service 112. For example, content storage interface 206 can be a component or service of content storage service 114, and file journal interface 202 can be a component or service of server synchronization service 112.

Content storage interface 206 can manage communications, such as content requests and/or interactions, between client device 150 and content storage 142. Content storage interface 206 can process requests from client device 150 to upload and download content to and from content storage 142. In some cases, content storage interface 206 can receive content requests (e.g., downloads, uploads, etc.) from client device 150, verify permissions (e.g., via access control list 145), authenticate/authorize client device 150 (e.g., via authorization service 126), and/or interact with content storage 142 to download or upload content in content storage 142 to client device 150. In some examples, if the request from client device 150 is a request to download a content item, content storage interface 206 can retrieve the content item from content storage 142 and provide the content item to client device 150. If the request from client device 150 is a request to upload a content item, content storage interface 206 can obtain the content item from client device 150 and upload the content item to content storage 142 for storage.

When processing content requests from client device 150, content storage interface 206 can check a storage index to determine the availability and/or storage location of the requested content in content storage 142, track content items in content storage 142, etc. In some cases, content items can be split into blocks or chunks which can be stored at content storage 142 and accessed by client device 150. For example, content storage 142 can store a content item as blocks or chunks of data which include respective data portions of the content item.

File journal interface 202 can manage communications, such as metadata requests, content synchronizations, operations, etc., between client device 150 and server file journal 148. For example, file journal interface 202 can translate, validate, authenticate, and/or process operations, configurations, and/or state information between client device 150 and server file journal 148. In some cases, file journal interface 202 can verify permissions from a toke (e.g., an FSAuth token, etc.) in a cursor or through authorization service 126, to authorize (or verify authorization of) requests sent by client device 150 to server file journal 148. When processing requests or operations from client device 150, file journal interface 202 can access namespace membership store 208 to determine or verify namespace ownership information for any namespaces associated with the requests or operations from client device 150. In some examples, file journal interface 202 can retrieve permissions information from access control list 145 to verify permissions of content associated with requests or operations from client device 150.

In some examples, translation service 204 in file journal interface 202 can perform linearization and/or translation operations for communications between client device 150 and server file journal 148. For example, in some cases, translation service 204 can translate communications from client device 150 to a different format consistent with a structure and format of data in server file journal 148, and vice versa. To illustrate, in some cases, client device 150 can process content item information (e.g., state, changes, versions, etc.) at client device 150 as operations, while server file journal 148 can process the same information as content item revisions reflected by rows in a data structure, such as a database table for example. In some cases, to enable synchronization of content item information between client device 150 and server file journal 148, translation service 204 can translate operations from client device 150 into revisions suitable for server file journal 148, and can translate revisions reflected in rows of data on server file journal 148 to operations suitable for client device 150.

In some cases, authorization service 126 can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, access permissions to identified collections, and/or any other authorization information. In some examples, the token can be included in a cryptographically signed data object or "cursor". Content management system 110 and/or authorization service 126 can send the token(s) to client device 150, and client device 150 can provide the token to content management system 110 when requesting content item revisions and/or updates to server file journal 148. Client device 150 can provide the token to content storage interface 206 to validate any content requests (e.g., downloads, uploads, etc.). Content storage interface 206 can use the token to authorize queries and upload or download content items to or from content storage 142.

For example, client device 150 can send to content storage interface 206 a request to upload a content item to content storage 142. The request can include the token and the content item to be uploaded. Content storage interface 206 can use the token to authorize a query to storage index 210 to check if the content item already exists on content storage 142, and authorize the upload of the content item to content storage 142. Client device 150 can also provide the token to file journal interface 202 to authorize a request to store metadata on server file journal 148 to track the upload and revision of the content item and/or any associated data.

Figure 3A:
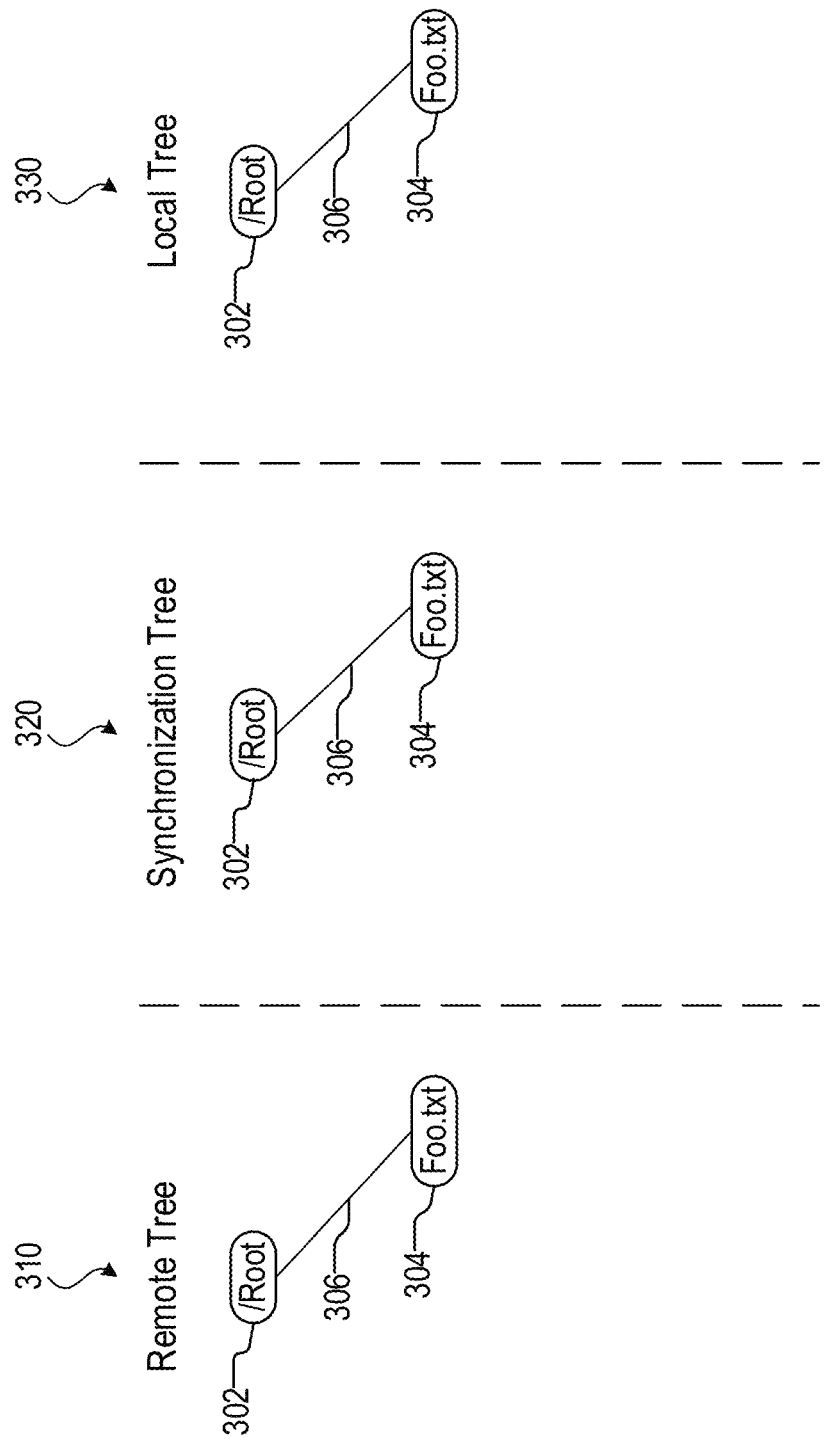
FIG. 3A shows example tree data structures used to manage content item information and synchronize content items, in accordance with some examples.

FIG. 3A shows example tree data structures used to manage content item information and/or synchronize content items, in accordance with some examples. The tree data structures can be stored at client device 150 and managed by client synchronization service 156. In FIG. 3A, the example tree data structures shown include remote tree 310, synchronization ("sync") tree 320, and local tree 330.

Remote tree 310 represents the state of content items stored remotely from client device 150 (e.g., at content management system 110), such as a server state. Local tree 330 represents the state of the corresponding content items stored locally on client device 150 (e.g., a file system state). Sync tree 320 represents a merge base for the local tree and the remote tree. In some examples, the merge base may be thought of as a common ancestor of the local tree and the remote tree or a last known synchronized state between the local tree and the remote tree.

Each tree data structure (e.g., remote tree 310, sync tree 320, and/or local tree 330) may include one or more tree nodes. A tree node can have one or more child tree nodes. A parent-child relationship between a parent tree node and a child tree node can be represented by an edge. For example, remote tree 310 includes tree nodes 302 and 304. Tree node 302 is a parent of tree node 304 and tree node 304 is a child of tree node 302. This parent-child relationship is represented by edge 306. A root tree node, such as root tree node 302, does not have a parent tree node. A leaf tree node, such as tree node 304, does not have a child tree node.

Each tree node in a tree data structure can represent a content item (e.g., a file, document, folder, link, etc.). For example, root tree node 302 may represent the root folder associated with a user account at content management system 110 and tree node 304 may represent a file (e.g., a text file named "Foo.txt") located in that root folder. Each tree node in a tree data structure may contain data such as, for example, a directory file identifier ("DirFileID") specifying the file identifier of a parent tree node of the content item, a file name for the content item, a file identifier for the content item, metadata for the content item, etc.

Non-limiting examples of metadata that may be contained in a tree node of a tree data structure can include one or more timestamps associated with the content item (e.g., a modification date, a lamport clock value, a creation date, etc.), a hash of the content item or portion of the content item, a blocklist associated with the content item, a hash of one or more blocks associated with the content item, a size or storage utilization of the content item, a hidden property indicating that the content item is hidden and/or should not be locally stored at client device 150, a path associated with the content item, a dirty bit, one or more extended attributes (xattrs), etc. As further described herein, a tree node in remote tree 310 (e.g., root tree node 302, tree node 304) can also include node metadata (also referred to as per-node metadata or PNM) used to implement a custom or specific behavior(s) for the content item associated with that tree node.

Remote tree 310, sync tree 320, and local tree 330 (and their associated data) can be used to synchronize a user account's content items stored at content management system 110 and client device 150. For example, as previously noted, remote tree 310 can represent the state of content items at content management system 110 (e.g., each tree node can represent a content item at content management system 110) and local tree 330 can represent the state of content items at client device 150 (e.g., each tree node can represent a content item at client device 150). Sync tree 320 can represent a merge base between remote tree 310 and local tree 330, and can be used to synchronize the state represented by remote tree 310 and local tree 330. Client device 150 can reconcile (e.g., via client application 152) conflicts and differences between remote tree 310 and local tree 330. Client device 150 and/or client application 152 can update local tree 330 to reflect a synchronized state (e.g., a synchronized state between content management system 110 and client device 150) for the content items, as determined based on remote tree 310, sync tree 320 and local tree 330. Client device 150 and/or client application 152 can use the synchronized state reflected by the updated local tree to make any updates or changes to the content items at client device 150 so a user account's content items stored at client device 150 are synchronized with (e.g., mirror) the user account's content items stored at content management system 110. Client device 150 and/or client application 152 can ensure that the hierarchy or structure of content items at client device 150 match the hierarchy or structure of the updated local tree, and the content items stored at client device 150 are consistent with associated tree nodes in the updated local tree.

In some examples, remote tree 310, sync tree 320, and local tree 330 (and their associated data) can also be used to manage and/or implement other aspects, features and/or functionalities of content items corresponding to tree nodes in remote tree 310, sync tree 320, and local tree 330. For example, a tree node in local tree 330 can include information indicating whether client device 150 should store (and synchronize) the content item (including the data of the content item) associated with that tree node or instead store a placeholder of the content item. The placeholder can provide a visual representation of the content item without storing the actual data of the content item. The placeholder can allow the content item to appear as if the content item is stored at client device 150 without using the storage space needed at client device 150 to store the actual data of content item. This way, individual content items can be selectively synchronized at client device 150 as placeholders or actual content items containing associated data. Selective synchronization settings for content items can be defined and/or included in the data contained in the tree nodes in local tree 330.

Remote tree 310, sync tree 320, and local tree 330 (and their associated data) can also be used to manage and/or implement other information, functionalities, and/or features for content items. For example, in some cases, each tree node can include a size of its corresponding content item. This information can be used to track the individual size of each content item on client device 150 and/or the combined size or storage utilization (and storage availability) of the content items at client device 150. The tree nodes can provide such size and storage information efficiently to client device 150 or client application 152, and may allow client device 150 or client application 152 to avoid having to query a database of content items for size or storage information and performing time-consuming size or storage calculations. Database queries can generate additional latencies in determining the size or storage information. The tree nodes can thus quickly provide the desired size or storage information and significantly reduce latencies by avoiding database lookups or queries.

Since the trees can reflect the structure (e.g., directory structure) and/or relationships of the content items on client device 150, client device 150 or client application 152 can quickly obtain the size or storage utilization of an entire folder or directory containing numerous content items, from the tree node associated with the folder or directory, without having to do a query for size information of each content item in the folder or directory and perform a sum to determine the total size of the folder or directory. Similarly, client device 150 or client application 152 can quickly obtain the total size of all content items from the parent or root tree node (e.g., root tree node 302) without having to query size information for multiple content items and perform a calculation from the queried information. This can significantly impact performance by reducing latency and calculation delays.

To illustrate, in some examples, the size or storage information obtained from the trees (e.g., remote tree 310, sync tree 320, local tree 330) can be used to efficiently present size and storage utilization information for one or more content items in a graphical user interface (GUI) for a user wanting to see size and storage information. For example, a user can navigate the content items represented by local tree 330 through a GUI on client device 150 or client application 152. The user can view or access the content items stored on client device 150 through the GUI, as well as information about the content items, such as names (e.g., filenames, directory names, file types, etc.), size or storage utilization (e.g., individual and/or combined size or storage utilization of content items), etc. The GUI can efficiently present this information about the content items, including the size and storage utilization information, by obtaining such information from remote tree 310 and/or local tree 330, which can allow the GUI to avoid having to query one or more databases and significantly reduce delays and latencies for obtaining and presenting such information.

In some examples, such a GUI on client device 150 or client application 152 can also allow the user to selectively enable and disable synchronization of one or more content items. The user can define selective synchronization settings, which can be maintained and/or identified in local tree 330 and used for selective synchronization as previously explained.

As previously mentioned, a tree node in remote tree 310 (e.g., root tree node 302, tree node 304) can include node metadata or PNM used to implement a custom or specific behavior(s) for the content item associated with that tree node. In some examples, the node metadata in a tree node can include a node attribute indicating a type of content item associated with that tree node. For example, the node metadata in a tree node can indicate that the content item associated with that tree node is a backup or device folder containing local content items backed up to content management system 110, a password-protected content item, an executable file, a document, a link file, a folder, a file, a symbolic link, a package, or any other type of content item. Client device 150 (e.g., via client application 152) and/or content management system 110 can map the node attribute (e.g., the content item type) to a custom or specific behavior to be applied and/or implemented for content items having that node attribute.

Accordingly, client device 150 can identify the node attribute in the node metadata and determine a custom or specific behavior associated with that node attribute and apply and/or implement the custom or specific behavior for the content item associated with the node metadata. In some examples, the custom or specific behavior defined/implemented for a content item (and/or a type of content item) can include content item features and/or actions such as, for example and without limitation, an icon or thumbnail to be used for a content item, one or more properties or menu items to be displayed for a content item (e.g., when a user accesses a menu or properties of the content item), actions or features to be allowed or suppressed for a content item (e.g., delete actions, move actions, content item sharing, content item link generation and/or sharing, restoring actions, backup actions, synchronization features (e.g., selective synchronization, synchronization format, etc.), input event actions or features (e.g., redirect upon selection, compress or decompress upon selection, request a password upon selection, render a prompt upon selection, disallow double-clicking, etc.), and/or any other feature and/or action.

For example, the node attribute in the node metadata of a content item can indicate that the content item is a password-protected vault for storing content items such as files, documents, folders, etc. The password-protected vault attribute can be mapped to a behavior that indicates that, when a user double-clicks on a password-protected vault, the user should be prompted for a password and, upon authentication of a password entered, the password-protected vault should dematerialize (e.g., expand or convert to a folder or container from where the user can view and access the content items in the vault). In this example, when a user-double clicks on the password-protected vault, client device 150 can identify the node attribute (e.g., from a corresponding tree node in remote tree 310) and translate the node attribute to the mapped behavior for the node attribute. Client device 150 can then render a prompt for a password and, if the correct password is entered, dematerialize the password-protected vault according to the mapped behavior for that node attribute.

Node metadata (and associated node attributes) and node behaviors as described above can be supported and applied across different devices, platforms (e.g., mobile platform, desktop platform, web platform, etc.), programming languages, runtime execution environments, code bases, applications, etc. The node metadata and associated behaviors can be agnostic to the device, platform, software, environment, etc. Rather than configuring and/or hard-coding behaviors for each content item, platform, device, programming language, runtime execution environment, code base, application, etc., the node metadata and node behaviors can be used to implement content item behaviors across content item types, devices, platforms, programming languages, runtime execution environments, code bases, applications, etc.

In some examples, node metadata can be mapped to a static behavior. For example, node metadata can be mapped to a behavior to be applied to any content item having that node attribute in the node metadata. In other examples, node metadata can be mapped to a dynamic behavior. In some examples, a dynamic behavior can include a condition which, when met, triggers a specific behavior. For example, a content item's node metadata can be mapped to a dynamic behavior that specifies a content item behavior for a specific user and/or device. To illustrate, a dynamic behavior can specify that the desktop folder of computer A cannot be deleted from computer A or selectively synchronized at computer A (e.g., synchronized as a placeholder without the associated data), but can be deleted and/or selectively synchronized at other computers. In this example, if a user attempts to delete or selectively synchronize the desktop folder at computer A, computer A can identify the dynamic behavior mapped to the node metadata of the desktop folder and prevent the user from deleting or selectively synchronizing the desktop folder. If the user attempts to delete or selectively synchronize the desktop folder at computer B, computer B can allow the deleting or selective synchronization of the desktop folder at computer B based on the dynamic behavior associated with the node metadata of the desktop folder.

As described above, client device 150 can use remote tree 310, sync tree 320, and local tree 330 to synchronize a state between content management system 110 and client device 150. In some examples, a client synchronization service can determine that a server state (e.g., a state at content management system 110) and a file system state of client device 150 (e.g., a state at client device 150) are synchronized when all 3 trees (e.g., remote tree 310, sync tree 320, and local tree 330) are identical. In other words, the trees are in sync when their tree structures and the relationships that they express are identical and the data contained in their nodes matches (optionally excluding any data that may not be implemented or enabled across all trees). Conversely, the trees are not in sync if the 3 trees are not identical (optionally excluding any data that may not be implemented or enabled across all trees). In the example scenario illustrated in FIG. 3A, remote tree 310, sync tree 320, and local tree 330 are shown as being identical and in sync. As a result, the server state and the file system state corresponding to the trees in FIG. 3A are synchronized.

Figure 3B:
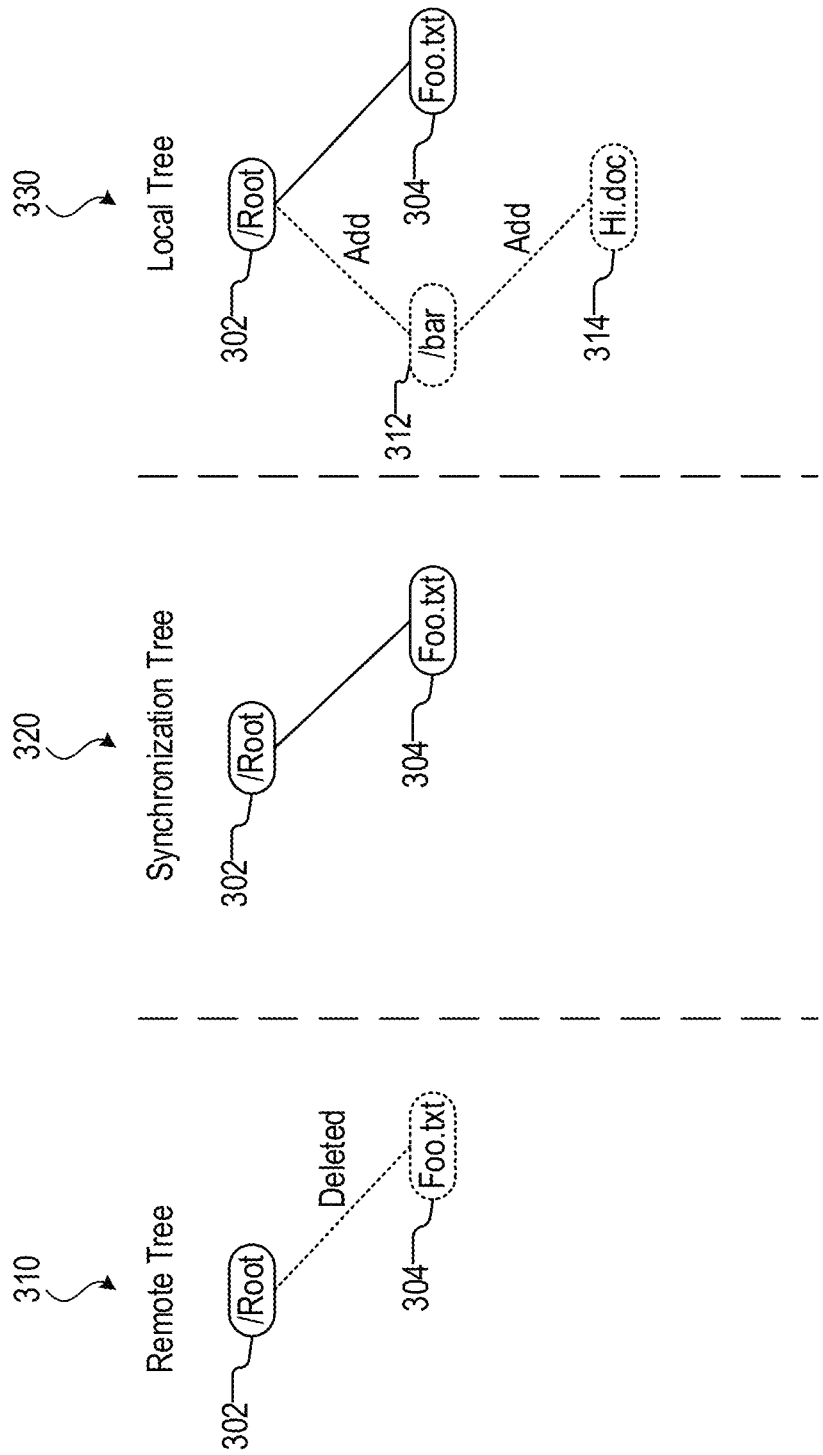
FIG. 3B shows example tree data structures used to track state changes for synchronizing content items, in accordance with some examples.

FIG. 3B shows example tree data structures tracking state changes for synchronization, in accordance with some examples. This example shows a scenario after actions being performed on the content items represented in the trees to modify the content items such that the trees are no longer in sync. Sync tree 320 maintains a representation of a previous synchronized state. Client synchronization service 156 can use sync tree 320 to identify the differences between the server state and the file system state. Client synchronization service 156 can determine and generate operations for content management system 110 and/or client device 150 to perform to converge changes so the server state and the file system state are synchronized.

For example, a user can make modifications to the "foo.txt" content item stored by content management system 110. This content item is represented by tree node 304 in remote tree 310. The modification shown in remote tree 310 is a removal (e.g., a removal of the content item from a space managed by content management system 110) or delete of the foo.txt content item. In some examples, some of these modifications may be performed, for example, on another client device and the modifications synchronized to the content item stored at content management system 110.

When the change is made on content management system 110, content management system 110 can generate modification data specifying the change made and transmit the modification data to client synchronization service 156 on the client device 150. Client synchronization service 156 can update remote tree 310 representing the server state for the content items stored by content management system 110 based on the modification data. For example, in remote tree 310, tree node 304 representing the foo.txt content item is shown as deleted.

Client synchronization service 156 may identify a difference between remote tree 310 and sync tree 320 and, as a result, determine that a modification of the content items at content management system 110 has caused the server state and the file system state to no longer be in sync. Client synchronization service 156 may generate and execute one or more operations for the content items stored at client device 150, to converge the server state and the file system state so that the content items are in sync. The one or more operations can implement the changes to the content items to synchronize the content items at client device 150 with the content items at content management system 110. For example, the one or more operations can delete the foo.txt content item at client device 150 consistent with the servers state where the foo.txt content item was deleted.

Additionally or alternatively, a user may make modifications to content items stored locally on client device 150, and client device 150 can synchronize such modifications with the user's content items at the content management system 110. For example, the user may add a folder "/bar" to the "/root" folder and add a "Hi.doc" document to the "/bar" folder.

When the change is made at client device 150, client device 150 (e.g., via client synchronization service 156 or client application 152) can generate modification data specifying the change made. Client synchronization service 156 can update local tree 330 representing the file system state for the content items stored on client device 150 based on the modification data. For example, in local tree 330, tree node 312 and tree node 314 are shown as added. Tree node 312 and Tree node 314 represent the "/bar" folder and the "Hi.doc" document respectively.

Client synchronization service 156 can identify a difference between local tree 330 and sync tree 320 and, as a result, determine that a modification of the content items at client device 150 has caused the server state and the file system state to no longer be in sync. Client synchronization service 156 can generate one or more operations for the content items stored at content management system 110 that are configured to converge the server state and the file system state so they are in sync. The one or more operations can be transmitted to content management system 110 for execution, so content management system 110 implements the associated modifications.

As seen in FIG. 3B, modifications to content items stored on client device 150 and content items stored at content management system 110 can be reflected in the tree data structures and used by client synchronization service 156 to generate sequences of operations for client device 150 and content management system 110.

As previously noted, node metadata and associated node behaviors can be implemented at the client device. For example, node metadata can be included in remote tree 310 at client device 150. In some cases, node metadata and associated node behaviors can be additionally or alternatively implemented at content management system 110. For example, node metadata can be implemented in server file journal 148 at content management system 110. In some examples, the location where the node metadata and associated node behaviors are implemented and/or where a client device obtains the node metadata and associated node behaviors can depend on the platform associated with the client device and/or vary for different platforms.

To illustrate, a desktop client may store node metadata (e.g., at local tree 330) and node behavior configurations locally. The desktop client can use the local node metadata and node behavior configurations to implement content item behaviors as described herein. On the other hand, in some examples, a mobile or web client may not store the node metadata and/or the node behavior configurations locally but rather obtain the node metadata and/or node behavior configurations from content management system 110.

Figure 4A:
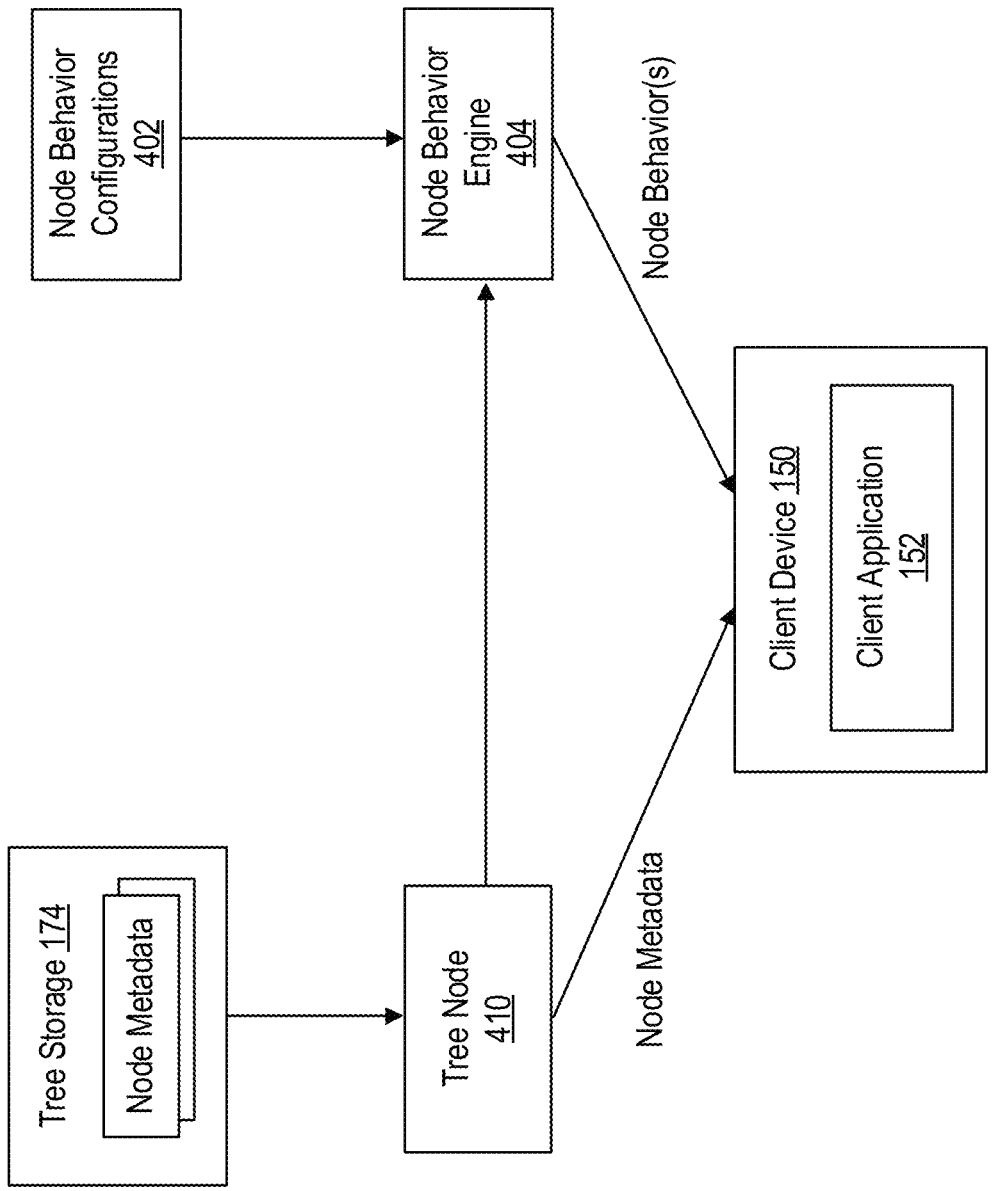
FIGS. 4A and 4B are diagrams illustrating example implementations of node metadata and behaviors, in accordance with some examples.

FIG. 4A is a diagram illustrating an example implementation of node metadata and behaviors. In this example, the example implementation can be locally implemented at client device 150 and/or partially implemented at client device 150. For example, client device 150 can locally store and/or access node metadata and derive node behaviors based on the node metadata and node behavior configuration data, which client device 150 can store and/or access locally or optionally obtain from content management system 110. In some examples, the implementation can be used for specific platforms such as, for example, a desktop platform. In other examples, the implementation can be used with any execution environment and/or platform (e.g., a desktop platform, a mobile platform, a web-based platform, etc.) implemented by client device 150.

As shown, tree storage 174 at client device 150 can include node metadata configured for content items. The node metadata can be included in nodes on a remote tree (e.g., remote tree 310) in tree storage 174, as previously described. In some cases, the nodes on the remote tree can include other data such as, for example, content item identifiers, content item information, state information, etc., as previously described.

Client device 150 can obtain tree node 410 from tree storage 174 to derive and/or apply a node behavior for a content item associated with tree node 410. The content item can be a content item at client device 150. In some cases, client device 150 can obtain tree node 410 when deriving and/or applying a node behavior for a content item associated with tree node 410. In some examples, client device 150 can obtain tree node 410 and/or determine a node behavior for a content item associated with tree node 410 in response to an event associated with the content item such as, for example, the content item being invoked, accessed, rendered, modified, manipulated, requested, called, etc., at client device 150.

Node behavior configurations 402 can specify behaviors associated with node metadata. For example, node behavior configurations 402 can specify custom behaviors for specific node attributes. In some cases, node behavior configurations 402 can map specific node attributes to specific node behaviors and/or types of node behaviors. The node attributes can be defined in node metadata as previously explained. In some examples, a node attribute can identify one or more attributes and/or characteristics of a content item associated with a node. For example, a node attribute can identify a type of content item, a content item class or label, a status associated with the content item, an application used for and/or configured to support the content item, a user and/or group associated with the content item, a device associated with the content item, etc.

In some cases, a node attribute can include information about a content item group or type applicable and/or corresponding to the content item. For example, a node attribute can identify the type of content item as a symbolic link, a vault, a password-protected file, a folder, a shared folder or namespace, an executable file, a content package, a link, a compressed folder, a media file, a document, etc. In other examples, a node attribute can include information specific to the content item such as a content item unique identifier or descriptor, a unique device identifier of a device associated with the content item, a user or group identifier of a user or group associated with the content item, etc. In some examples, the unique device identifier, user identifier, and/or group identifier can be used to the define and/or apply a user, device, and/or group specific behavior for a content item. For example, the unique device identifier, user identifier, and/or group identifier can be used to implement a dynamic behavior, as further described below.

As previously noted, node behavior configurations 402 can define behaviors for specific node attributes. In some cases, a node attribute can be associated with one or more behaviors. For example, a node attribute can be associated with a single node behavior or multiple node behaviors. A node behavior associated with a node attribute can be static or dynamic. A dynamic behavior can include a behavior for a tree node that is dynamically applied to an associated content item when one or more conditions are satisfied. The one or more conditions can specify, for example, a device-specific condition (e.g., a condition limiting a behavior for a content item to a specific device), a user account specific condition (e.g., a condition limiting a behavior for a content item to a specific user account or group), a platform-specific condition (e.g., a condition limiting a behavior for a content item to a specific platform), a timing condition (e.g., a condition limiting a behavior for a content item to a specific date, time, schedule, or period), a state-specific condition (e.g., a condition limiting a behavior for a content item to a specific device, operating, and/or content item state), a restrictive condition (e.g., a condition limiting a behavior for a content item to a specific access level, policy, group membership, etc.), and/or any other conditions.

In some examples, a node behavior can include one or more content item features and/or actions such as, for example and without limitation, an icon or thumbnail to be used for a content item, one or more properties or menu items to be displayed for a content item (e.g., when a user accesses a menu or properties of the content item), actions or features allowed or prohibited for a content item (e.g., delete actions, move actions, content item sharing, content item link generation and/or sharing, restoring actions, backup actions, synchronization features (e.g., selective synchronization, synchronization format, etc.), input event actions or features (e.g., redirect upon selection, compress or decompress upon selection, request a password upon selection, render a prompt upon selection, disallow double-clicking, etc.), content item properties, and/or any other feature and/or action.

Node behavior engine 404 can use node metadata in tree node 410 and node behavior configurations 402 to determine what behavior should apply to a content item associated with (e.g., represented by) tree node 410. For example, node behavior engine 404 can determine a node attribute defined in tree node 410, and determine a node behavior configured and/or specified for the node attribute in node behavior configurations 402. Node behavior engine 404 can then provide node behavior information to client application 152 (or a different application at client device 150). The node behavior information can identify what behavior client device 150 should apply (e.g., via client application 152 or another application) to the content item associated with tree node 410. In some examples, the node behavior information can include code for implementing the node behavior, node behavior properties or settings, one or more operations for implementing the node behavior, one or more instructions for implementing the node behavior, and/or a behavior specification defining or describing the node behavior (and/or how to implement the node behavior).

In some examples, to determine the node behavior information, node behavior engine 404 can translate and/or derive a node behavior (and/or associated node behavior details, code, instructions, and/or specifications) based on the node metadata in tree node 410 and node behavior configurations 402. In some cases, node behavior engine 404 can translate a node behavior determined for tree node 410 to specific node behavior properties or settings, operations for implementing the node behavior, instructions for implementing the node behavior, code for implementing the node behavior, and/or a behavior specification.

In some examples, node behavior engine 404 can be hosted and/or implemented by client device 150. In other examples, node behavior engine 404 can be hosted and/or implemented by content management system 110. In some cases, both client device 150 and content management system 110 can host and/or implement node behavior engine 404 (and/or portions thereof).

Node behavior engine 404 can include, for example and without limitation, software (e.g., a software library, a software tool, a software application, code, a handler, a function, etc.) configured to derive node behaviors based on node metadata (e.g., based on node attributes). In some examples, node behavior configurations 402 and/or node behavior engine 404 can be part of, or implemented by, client application 152. In other examples, node behavior configurations 402 and/or node behavior engine 404 can be implemented at client device 150 separately from client application 152.

In some cases, client device 150 can store the node behavior information to implement the node behavior as triggered. For example, node behavior information can include node behavior code and/or specifications that client device 150 can maintain to apply the node behavior to the content item and any other content items having the same node attribute, any time the node behavior is triggered. In other cases, client device 150 can obtain and use the node behavior information on demand (e.g., as needed) when the node behavior is triggered. In some examples, the node behavior can be triggered based on an event. For example, client device 150 can apply a node behavior in the node behavior information in response to an input or interaction with the content item, during and/or prior to a content item operation or interaction, in response to a node behavior call, etc.

In some examples, client device 150 can determine the node behavior information in response to an event, such as a content item event. For example, node behavior engine 404 can determine the node behavior information in response to an input or interaction with the content item associated with tree node 410, such as a user clicking or double clicking on the content item, a content item operation (e.g., a move operation, a delete operation, a sharing operation, a rename operation, etc.), a content item configuration input, and/or any other input or interaction. In some examples, node behavior engine 404 can determine the node behavior information during and/or prior to a content item operation or interaction.

For illustration and explanation purposes, FIG. 4A illustrates an example implementation using a single tree node. However, it should be noted that, in other examples, client device 150 can similarly implement node behaviors for multiple and/or different tree nodes and content items. In some cases, node metadata and/or node attributes can be reused to apply node behaviors to different content items (of a same or different type). Moreover, node metadata and/or node attributes can be reused to apply associated node behaviors across different platforms, devices, environments, etc.

Figure 4B:
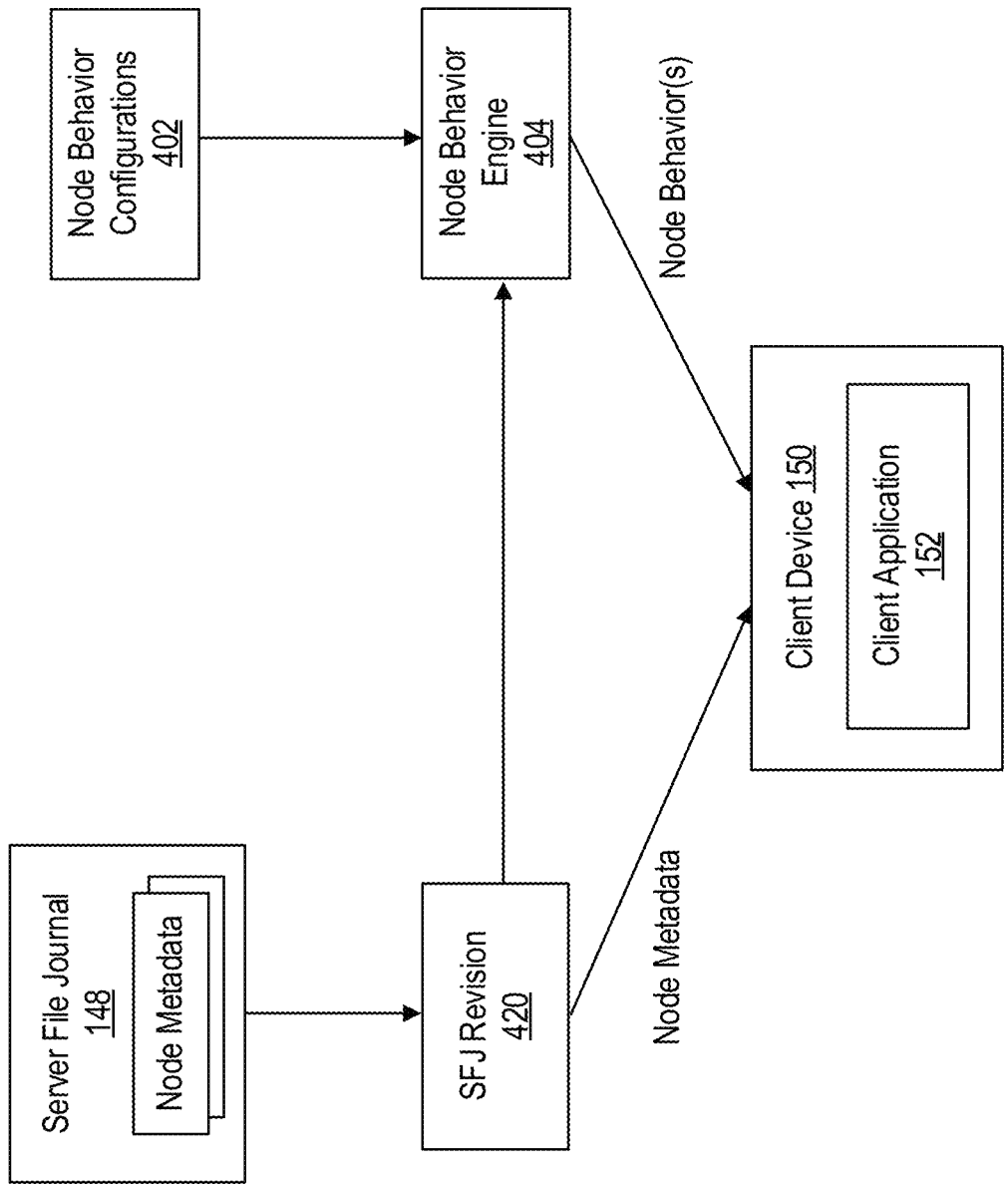

FIG. 4B is a diagram illustrating another example implementation of node metadata and behaviors. In this example, the example implementation can include and/or be based on remote data and/or interactions, such as metadata and/or other data in content management system 110. For example, client device 150 can obtain node metadata and/or node behaviors from content management system 110, and implement and/or apply the node metadata and/or node behaviors based on the node metadata and/or node behaviors. In some examples, the example implementation can be used with any execution environment and/or platform (e.g., a desktop platform, a mobile platform, a web-based platform, etc.) implemented by client device 150. In other examples, the example implementation can be used for specific platforms such as, for example, a mobile and/or web-based platform. For example, client device 150 can use the example implementation in FIG. 4B when implementing and/or applying node behaviors to content items through a mobile platform and/or a web browser.

As shown, server file journal 148 at content management system 110 can include node metadata configured for content items. In some cases, server file journal 148 can track content item revisions (e.g., content item state and/or events) and associated node metadata. To implement a node behavior for a content item, client device 150 can obtain server file journal (SFJ) revision 420 from server file journal 148. The content item can include a content item accessed locally at client device 150 or accessed remotely by client device 150 from content management system 110. SFJ revision 420 can include a revision associated with the content item. The revision can include node metadata associated with the content item, such as a node attribute. In some cases, the revision can include a state and/or operation associated with the content item, such as a state and/or operation to be applied for the content item.

Client device 150 can obtain SFJ revision 420 and identify node metadata, such as a node attribute, associated with a content item. In some cases, client device 150 can use the note metadata in SFJ revision 420 to derive and/or apply a node behavior for the content item. In some examples, client device 150 can obtain SFJ revision 420 when deriving and/or applying a node behavior for the content item. In some examples, client device 150 can obtain SFJ revision 420 and/or determine a node behavior for the content item in response to an event associated with the content item such as, for example, the content item being invoked, accessed, rendered, modified, etc., at client device 150. In other examples, client device 150 can obtain SFJ revision 420 prior to deriving and/or applying a node behavior for the content item.

Node behavior engine 404 can use node metadata in SFJ revision 420 and node behavior configurations 402 to determine what behavior should apply to a content item associated with (e.g., represented by) SFJ revision 420. For example, node behavior engine 404 can determine a node attribute defined in SFJ revision 420, and determine a node behavior configured and/or specified for the node attribute in node behavior configurations 402. Node behavior engine 404 can then provide node behavior information to client application 152 (or a different application at client device 150). The node behavior information can identify what behavior client device 150 should apply (e.g., via client application 152 or another application) to the content item associated with SFJ revision 420. As previously explained, in some examples, the node behavior information can include code for implementing the node behavior, node behavior properties or settings, one or more operations for implementing the node behavior, one or more instructions for implementing the node behavior, a behavior specification defining or describing the node behavior (and/or how to implement the node behavior), etc.

In some examples, node behavior engine 404 can be hosted and/or implemented by client device 150. In some examples, node behavior engine 404 can be hosted and/or implemented by content management system 110. In other examples, both client device 150 and content management system 110 can host and/or implement node behavior engine 404 (and/or portions thereon).

In some examples, client device 150 can determine the node behavior information (e.g., via node behavior engine 404) and/or obtain the node behavior information (e.g., from content management system 110 and/or node behavior engine 404) in response to an event, such as a content item event. For example, node behavior engine 404 can determine the node behavior information and provide the node behavior information to client device 150 in response to an input or interaction with the content item associated with SFJ revision 420, as previously described. In some examples, node behavior engine 404 can determine the node behavior information and provide the node behavior information to client device 150 during and/or as part of a state and/or content item synchronization operation. Moreover, in some cases, client device 150 can apply a node behavior in the node behavior information in response to an input or interaction with the content item, and/or during or prior to a content item operation or interaction.

For illustration and explanation purposes, FIG. 4B illustrates an example implementation using a single SFJ revision. However, it should be noted that, in other examples, client device 150 can similarly implement node behaviors for multiple and/or different SFJ revisions and content items.

Figure 5:
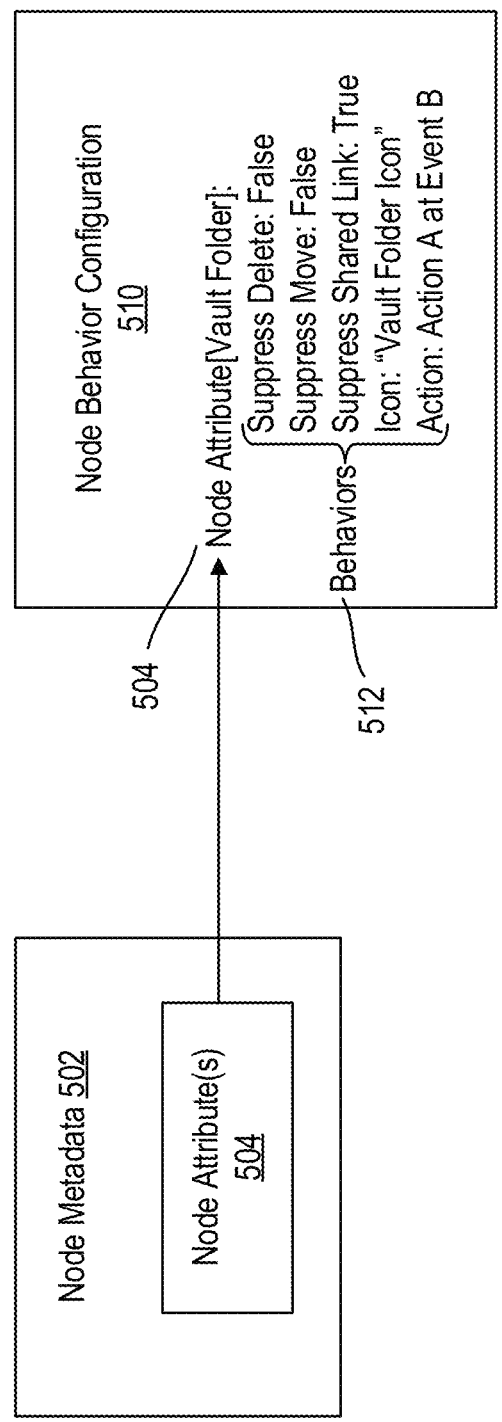
FIG. 5 is a diagram showing an example mapping of a node attribute and node behaviors, in accordance with some examples.

FIG. 5 is a diagram showing an example mapping of a node attribute and node behaviors. In this example, node metadata 502 includes node attribute 504 associated with a content item. Node attribute 504 can be used to identify a node behavior(s) for the content item from node behavior configuration 510.

Node behavior configuration 510 includes behaviors 512 defined for node attribute 504. In this example, node attribute 504 identifies an associated content item as a vault folder. The behaviors 512 include behaviors defined for vault folders. As shown, the behaviors 512 can be identified in node behavior configuration 510 based on node attribute 504.

In this example, node behaviors 512 indicate that delete operations for node attribute 504 (e.g., for vault folders) should not be suppressed (e.g., should be allowed), move operations for node attribute 504 should not be suppressed, and sharing links for node attribute 504 should be suppressed (e.g., should not be allowed). Node behaviors 512 also identify an icon that should be implemented (e.g., rendered) and/or used for node attribute 504 (e.g., for vault folders) and an example action (e.g., Action A) that should be performed at a certain event (e.g., Event B).

The action can include any action defined for the content item associated with node metadata 502. Non-limiting example actions can include redirecting a user or an application to a specific destination (e.g., a specific application, location, content item, message, content within a content item (e.g., anchored content, a comment, etc.), interface, account, etc.), rendering a prompt or sequence of prompts, generating an alert or notification, activating a content item feature, requesting a password, generating an error, modifying a content item state, etc. The event can include an action/activity (e.g., clicking on the content item, accessing the content item, interacting with the content item, etc.), a condition (e.g., a trigger, rule, etc.), etc.

Node attribute 504 in node metadata 502 can be used to identify node behaviors 512 in node behavior configuration 510 in order to implement and/or apply node behaviors to a content item associated with node metadata 502. In some examples, node behaviors 512 can be provided to client device 150 to implement and/or apply to a content item. In some cases, node behaviors 512 can be translated and/or converted to node behavior specifications or instructions, which client device 150 can use to implement and/or apply the node behaviors.

In some examples, node metadata and attributes (e.g., node metadata 502, node attribute 504) can be used to identify and implement, control (e.g., allow, restrict, etc.) and/or apply filesystem behaviors (e.g., copy, move, rename, modify, delete, read, mount, unmount, etc.) to a content item. In some cases, node metadata and attributes can be used to store and/or synchronize data used for application-specific behaviors. For example, instead of requiring an application to fetch such data from content management system 110, node metadata can be used to access such data (or a portion thereof) so an application at a client device does not have to fetch such data (or a portion thereof) from content management system 110. As another example, the node metadata can be used to override default behaviors associated with an application and/or a content item.

To illustrate, content management system 110 can generate sharing links for content items (e.g., links to content items that can be used to share such content items and/or access to such content items with other users). Content management system 110 can store a copy of the sharing links, and allow client devices or client applications to retrieve the sharing links from content management system 100. However, in some examples, node metadata stored on a client device can include a copy of the sharing links. This way, when a user wants to access and/or share a sharing link, instead of requiring the client device or client application to retrieve the sharing link from content management system 110, the client device or client application can fetch the sharing link from node metadata at the client device and thus avoid having to fetch the sharing link from content management system 100. By allowing the client device or client application to fetch the sharing link from node metadata at the client device, the user can obtain a faster user experience and can access the sharing link even if the network and/or content management system 100 is/are unavailable.

Figure 6A:
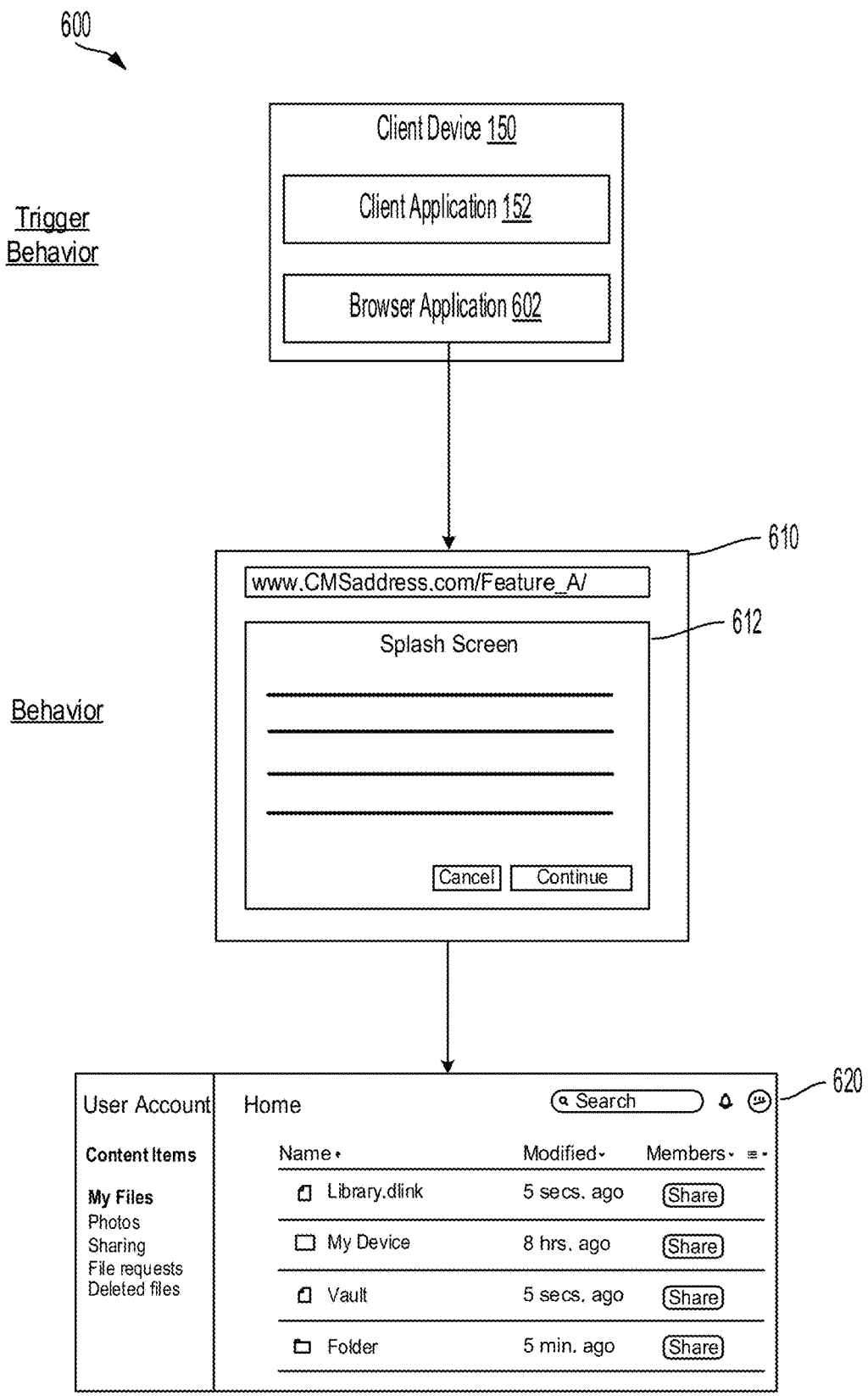
FIGS. 6A through 6C are diagrams illustrating example experiences of an example behavior implemented using node metadata, in accordance with some examples.

FIG. 6A is a diagram illustrating an example web-based experience 600 of an example behavior implemented using node metadata. In this example, the behavior is a prompt or sequence of prompts, such as a setup flow for product or feature, rendered when a user accesses an entry point through browser application 602 on client device 150. An entry point can include an object (e.g., a content item, a web page, a location, etc.) for accessing, configuring, activating, and/or installing a feature, package, application, product, tool, and/or the like. In this example, the entry point is a web page 610 (and/or web page content) accessed from browser application 602. Browser application 602 can include a web browser or any application for accessing web content. In some examples, web page 610 can include a web page hosted and/or served by content management system 110. For example, web page 610 can include a home page for a user account on content management system 110.

When browser application 602 navigates to web page 610, a node behavior configured for web page 610 (and/or a content item in web page 610) can be triggered based on node metadata associated with web page 610 (and/or a content item in web page 610), as previously explained. As shown, when browser application 602 navigates to web page 610, browser application 602 can dynamically display splash screen 612. Splash screen 612 can be the node behavior configured and triggered based on the associated node metadata. In some cases, splash screen 612 can include, for example, one or more prompts, such as a setup screen or interface, for setting up a feature, package, application, product, tool, and/or the like.

Once splash screen 612 has completed and/or been terminated, browser application 602 can continue to web page 620. Web page 620 can be the same web page as web page 610, a different web page as web page 610, a different view of web page 610, and/or any other web page and/or web page view. For example, web page 620 can be a landing or welcome page associated with the entry point. As another example, web page 620 can be a view and/or version of web page 610 presented after a feature, product, tool, setting, etc., associated with the entry point has been set up. In some examples, web page 620 can display and/or identify any feature, product, tool, application, item, content item, etc., activated and/or available through the entry point.

Figure 6B:
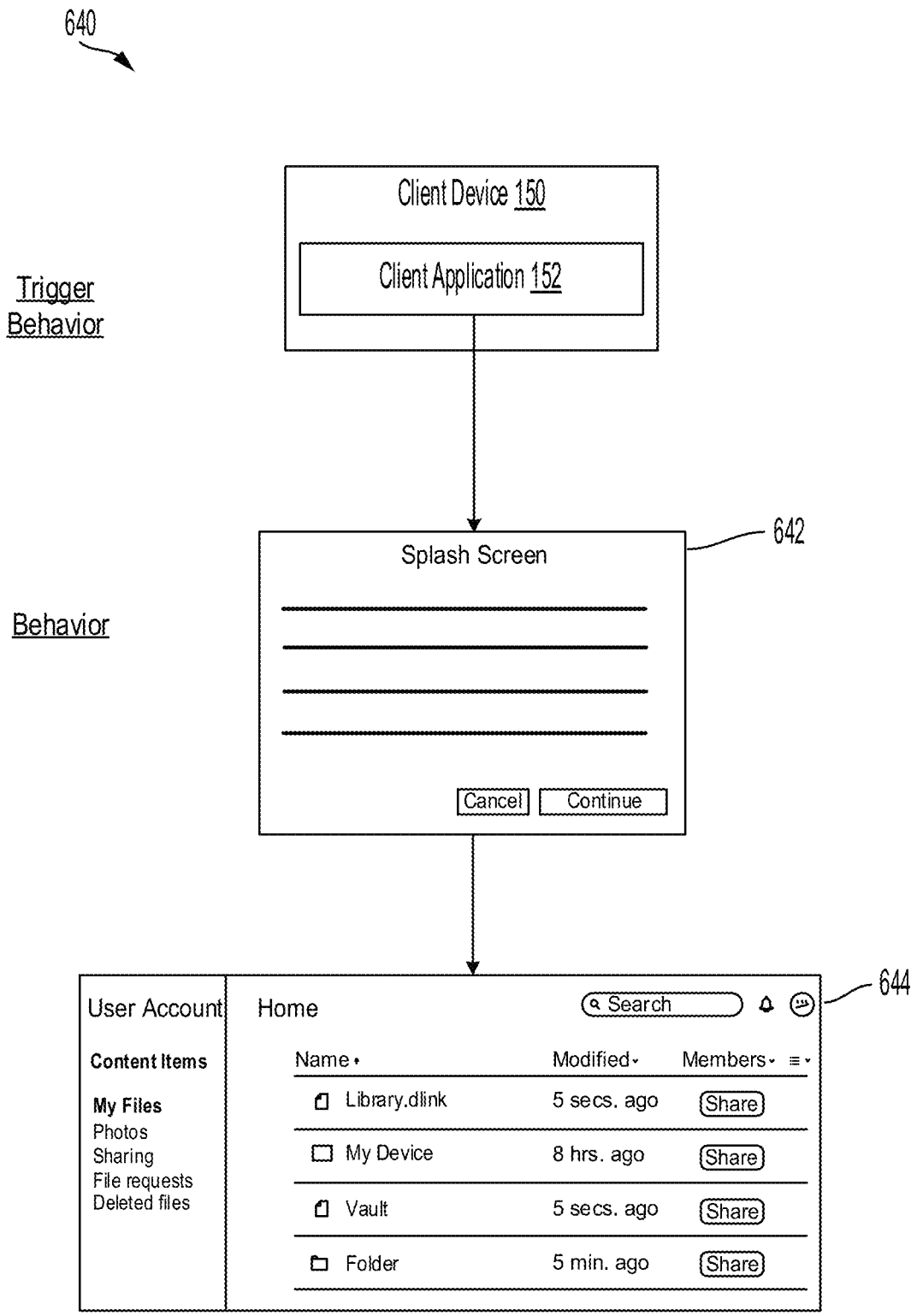

FIG. 6B is a diagram illustrating an example desktop experience 640 of the example behavior described above with respect to FIG. 6A. In this example, the behavior is a prompt or sequence of prompts rendered when the user accesses an entry point through client application 152 on client device 150. The entry point can include, for example, a content item on client device 150 accessed from client application 152. While FIG. 6B illustrates an entry point accessed through client application 152, it should be noted that an entry point can be accessed through any application and client application 152 is used herein as merely one illustrative example for explanation purposes. For example, in some cases, the user can access an entry point through a file browser/manager, a web browser, and/or any other application. Moreover, the user can interact with an entry point as described below through the file browser/manager, web browser, and/or any other application.

When client application 152 accesses the entry point (e.g., in response to an event or input such as a user clicking on the entry point), the node behavior configured for the entry point can be triggered based on node metadata associated with the entry point. As shown, when client application 152 triggers the behavior, client device 150 can dynamically display splash screen 642. Splash screen 642 can be the node behavior configured and triggered based on the associated node metadata. In some cases, splash screen 642 can be displayed by client application 152 (e.g., via an interface or window associated with client application 152) or a different application at client device 150. In some examples, splash screen 642 can be an interface or window of client application 152. In other examples, splash screen 642 can be a separate or standalone window, interface, splash screen, and/or the like.

Once splash screen 642 has completed and/or been terminated, client application 152 can continue to interface 644. Interface 644 can be a window or interface for navigating and/or accessing content items on client device 150 (e.g., on a file system of client device 150). The content items can include local versions of content items stored on content management system 110 for a user account registered with content management system 110. In some examples, interface 644 can display a content item, feature, application, tool, etc., available once splash screen 642 has completed.

Figure 6C:
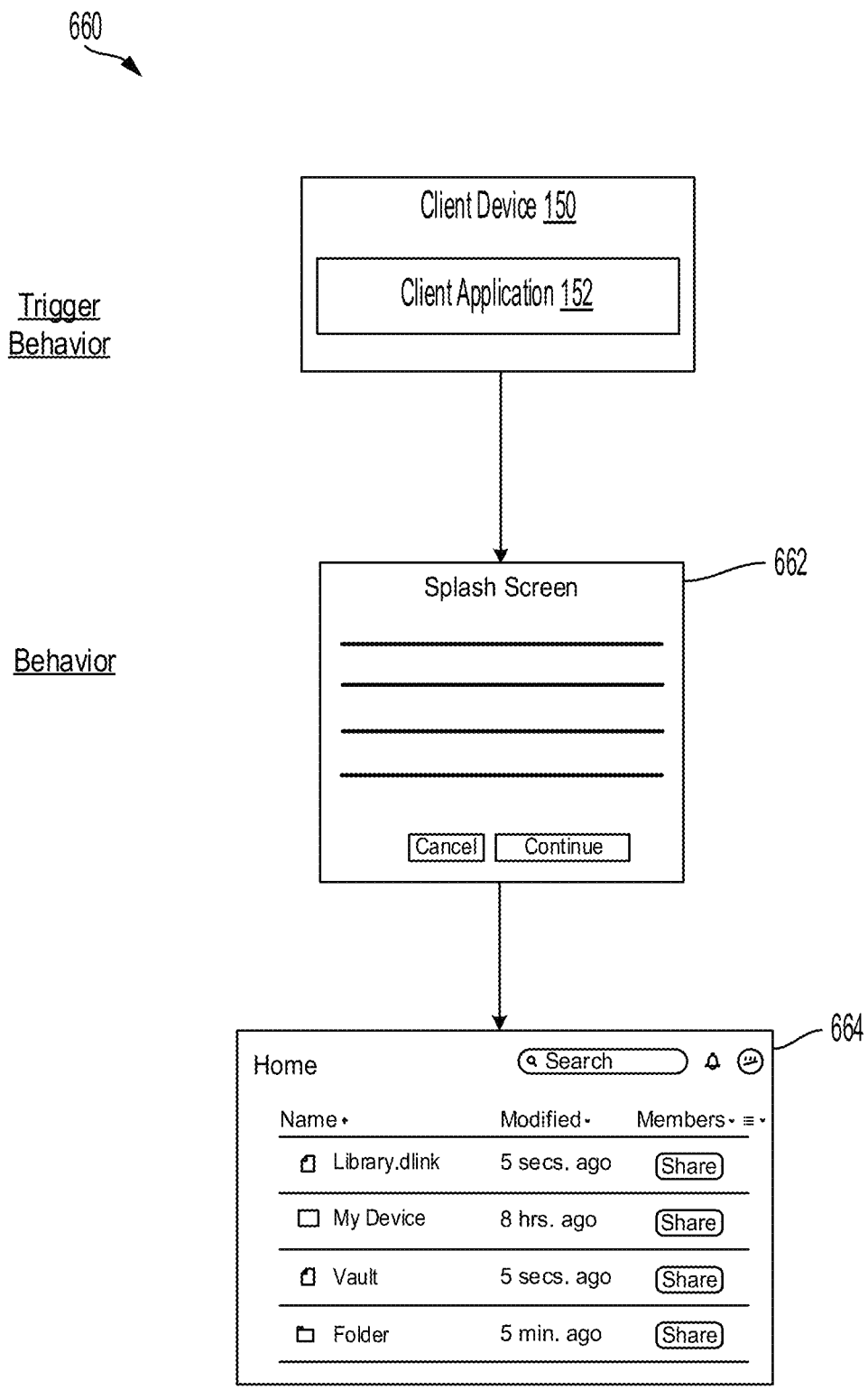

FIG. 6C is a diagram illustrating an example mobile experience 660 of the example behavior described above with respect to FIGS. 6A and 6B. In this example, the behavior is a prompt or sequence of prompts rendered on a mobile platform when the user accesses an entry point on the mobile platform. The entry point can include, for example, an application on client device 150 (e.g., client application 152), an object on the application, a content item on client device 150, etc.

When the node behavior is triggered, client application 152 can dynamically display splash screen 662. Once splash screen 662 has completed and/or been terminated, client application 152 can continue to interface 664. Interface 664 can be window or interface for accessing content items from a mobile platform. The content items can include content items stored on content management system 110 for a user account registered with content management system 110 and/or local versions of the content items stored on content management system 110. In some examples, interface 664 can display a content item, feature, application, tool, etc., available once splash screen 662 has completed.

Figure 7:
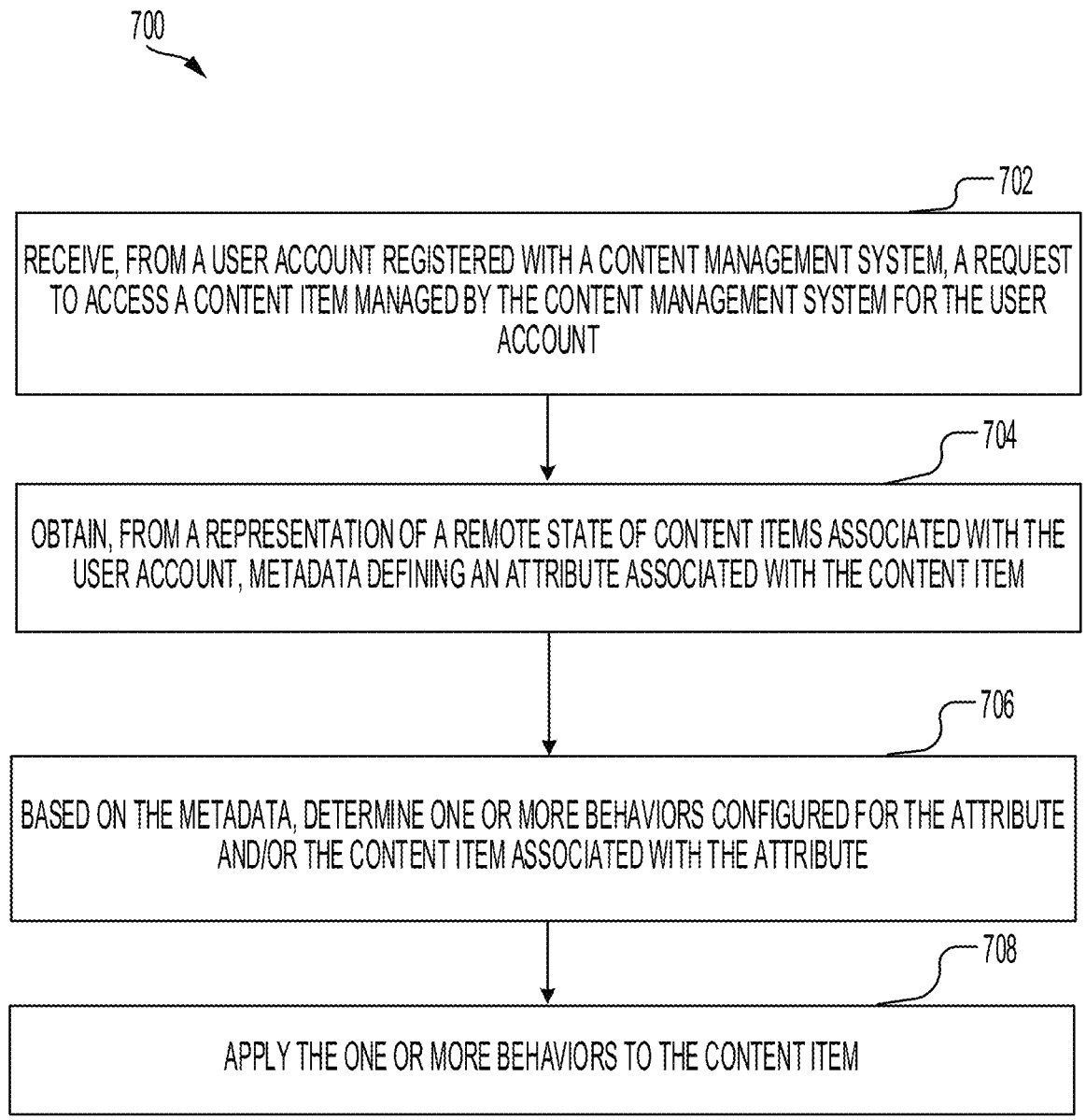
FIG. 7 is a flowchart illustrating an example method for implementing content item behaviors based on node metadata, in accordance with some examples.

Having disclosed example system components and concepts, the disclosure now turns to example method 700 for implementing content items behaviors based on node metadata, as shown in FIG. 7. The steps outlined herein are non-limiting examples provided for illustration purposes, and can be implemented in any combination thereof, including combinations that exclude, add, or modify certain steps.

At block 702, method 700 can include receiving, from a user account registered with a content management system (e.g., content management system 110), a request to access a content item managed by the content management system for the user account. In some examples, the content item can have one or more behaviors (e.g., node behavior(s) 512) configured for an attribute associated with the content item (e.g., node attribute 504) and/or the content item associated with the attribute.

In some examples, the content item can also have a predefined behavior (e.g., predefined features, configurations, functionalities, etc.) based on a file extension of the content item, the type of content item, and/or an application associated with the file extension. The application associated with the file extension can be, for example, a native application for the file extension or an application designed to support content items having the file extension.

The request to access the content item can include, for example, a call or message to invoke the content item, a content item operation, a selection (e.g., clicking, double clicking, right clicking) of the content item, and/or any input or operation associated with the content item.

At block 704, the method 700 can include obtaining, from a representation of a remote state of content items (e.g., server file journal 148, remote tree 310) associated with the user account, metadata (e.g., node metadata 502) defining the attribute (e.g., node attribute 504) associated with the content item. In some examples, a client device (e.g., client device 150) can retrieve the metadata from a remote tree (remote tree 310) on the client device. In other examples, the client device can receive the metadata from the content management system (e.g., from server file journal 148 of content management system 110). In some cases, the metadata can be obtained from the remote tree or the server file journal depending on the platform at the client device. For example, when the client device implements or uses a desktop platform, the client device can retrieve the metadata from the remote tree, and when the client device implements or uses a web-based platform or mobile platform, the client device an receive the metadata from the server file journal.

In some examples, the representation of the remote state of content items associated with the user account can include a remote tree data structure (e.g., remote tree 310) stored at a client device. As previously explained, the remote tree data structure can include nodes corresponding to the content items associated with the user account, and each node can identify a current state at the content management system of an associated content item stored at the content management system. In other examples, the representation of the remote state of the content item can include a data structure that logs content item revisions implemented at the content management system (e.g., server file journal 148 and/or a data structure at server file journal 148).

At block 706, the method 700 can include determining, based on the metadata, one or more behaviors (e.g., node behavior(s) 512) configured for an attribute associated with the content item (e.g., node attribute 504) and/or the content item associated with the attribute. In some cases, a client device or the content management system can determine the one or more behaviors based on the attribute and a node behavior configuration (e.g., node behavior configuration 510) defining the one or more behaviors for the attribute.

In some examples, the attribute can identify a type of content item associated with the content item, and the one or more behaviors can be configured for the type of content item. In some cases, the one or more behaviors can include a static behavior or a dynamic behavior, as previously explained. For example, the additional behavior can include a dynamic behavior as previously described in the discussion of FIG. 4A.

In some cases, the attribute can be mapped to the one or more behaviors (e.g., via a node behavior configuration). In some examples, the one or more behaviors can include a custom behavior that is different from a predefined behavior associated with the content item. In some examples, the predefined behavior can be based on (and/or defined or dictated by) a file extension associated with the content item, the type of content item, and/or an application associated with the file extension. The custom behavior (e.g., the one or more behaviors) can be implemented/applied for/to the content item in addition to or instead of the predefined behavior. For example, the custom behavior can be applied to the content item as further described in block 708 as an additional or different behavior for the content item (e.g., in addition to or instead of a predefined behavior).

The one or more behaviors can include, for example and without limitation, prompting for a password prior to providing access to a content of the content item, restricting a content item operation (e.g., move, share, delete, read, write, right click, synchronize, rename, etc.), allowing a content item operation (e.g., move, share, delete, read, write, right click, synchronize, rename, etc.), displaying an icon for the content item, modifying a menu associated with the content item, redirecting the user account to a destination, a synchronization behavior, and/or displaying an interface when the content item is invoked.

In some examples, determining the one or more behaviors can include determining the type of content item associated with the content item based on the attribute and determining the one or more behaviors configured for the type of content item.

At block 708, the method 700 can include applying the one or more behaviors to the content item. In some examples, applying the one or more behaviors to the content item can include implementing the one or more behaviors for the content item and/or performing the one or more behaviors for the content item. For example, if the one or more behaviors include a use of an icon for the content item, applying the one or more behaviors can include implementing and/or displaying the icon for the content item. As another example, if the one or more behaviors include suppressing move operations for the content item, applying the one or more behaviors to the content item can include preventing a move operation attempted for the content item.

In some examples, the metadata can be obtained via an application (e.g., client application 152) associated with the content management system. In some cases, applying the one or more behaviors can include performing, via the application, the one or more behaviors prior to the content item being accessed by an additional application associated with the file extension.

Figure 8:
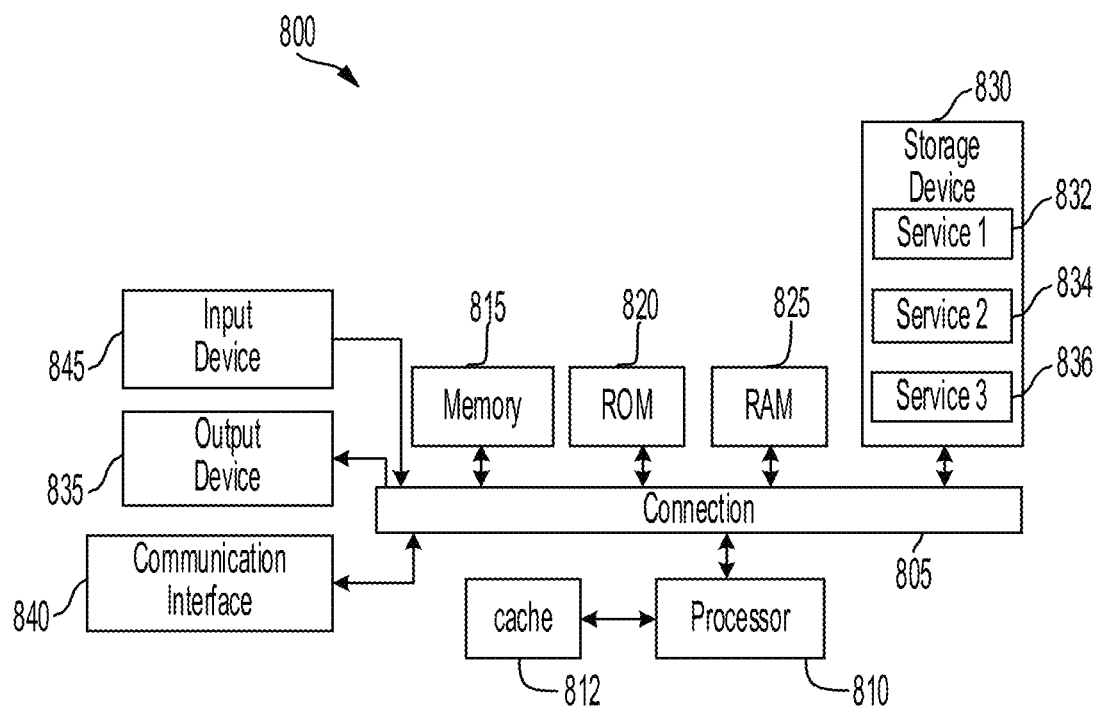
FIG. 8 shows an example system for implementing various aspects of the present technology, according to some examples.

FIG. 8 shows an example of computing system 800, which can be for example any computing device making up client device 150, content management system 110 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple datacenters, a peer network, etc. In some examples, one or more of the described system components represents many such components each performing some or all of the function for which the component is described. In some examples, the components can be physical or virtual devices.

Example computing system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   receiving, from a user account registered with a content management system, a request to access a content item managed by the content management system for the user account, wherein revisions to the content item are logged;
   determining that the content item having an is associated with a type-based custom attribute that is stored as respective node metadata of a tree data structure at the content management system that indicates to the content management system that if the content item is a certain type of content item then it is a password-protected encrypted content item;
based on the respective node metadata from the content item, handling the content item as the password-protected encrypted content item that can be decrypted by an application associated with the content management system when a password is provided; in response to a receipt of authentication of the password, initiating a decryption procedure; and
in response to a successful decryption of the content item, opening the decrypted content item based on instructions from the type-based custom attribute without depending on a file extension associated with the decrypted content item.

2. The method of claim 1, wherein the content item comprises one or more behaviors comprising at least one of:
implementing the one or more behaviors for the content item; and
performing the one or more behaviors for the content item.

3. The method of claim 1, wherein the type-based custom attribute identifies a type of the content item associated with the content item, and wherein one or more behaviors are configured for the type of the content item.

4. The method of claim 1, further comprising determining one or more behaviors of the content item, wherein the determining comprises:
determining a type of the content item associated with the content item based on the type-based custom attribute; and
determining the one or more behaviors configured for the type of the content item.

5. The method of claim 1, wherein the type-based custom attribute is mapped to one or more behaviors, and wherein the one or more behaviors comprise one or more custom behaviors that are different from a predefined behavior associated with the content item, the predefined behavior being based on at least one of the file extension associated with the content item, the application associated with the file extension, and a type of the content item associated with the content item.

6. The method of claim 5, wherein the one or more behaviors comprise at least one of prompting for the password prior to providing access to a content of the content item, restricting a content item operation, allowing the content item operation, displaying an icon for the content item, modifying a menu associated with the content item, redirecting the user account to a destination, a synchronization behavior, allowing or restricting a move operation, allowing or restricting a renaming operation, allowing or restricting a modify operation, and displaying an interface when the content item is invoked.

7. The method of claim 1, wherein the tree data structure is a representation of a remote state of the content item that comprises a data structure that logs content item revisions implemented at the content management system.

8. A system comprising:
one or more processors; and
at least one non-transitory computer-readable medium having stored therein instructions which, when executed by the one or more processors, cause the one or more processors to:
receive, from a user account registered with a content management system, a request to access a content item managed by the content management system for the user account, wherein revisions to the content item are logged;
determine that the content item is associated with a type-based custom attribute associated with the content item that is stored as respective node metadata of a tree data structure at the content management system that indicates to the content management system that if the content item is a certain type of content item then it is a password-protected encrypted content item;
based on the respective node metadata from the content item, handle the content item as the password-protected encrypted content item that can be decrypted by an application associated with the content management system when a password is provided;
in response to a receipt of authentication of the password, initiate a decryption procedure; and
in response to a successful decryption of the content item, opening the decrypted content item based on instructions from the type-based custom attribute without depending on with a file extension associated with the decrypted content item.

9. The system of claim 8, wherein the content item comprises one or more behaviors comprising at least one of: implementing the one or more behaviors for the content item; and performing the one or more behaviors for the content item.

10. The system of claim 8, wherein the type-based custom attribute identifies a type of the content item associated with the content item, and wherein one or more behaviors are configured for the type of the content item.

11. The system of claim 8, further comprising determining one or more behaviors of the content item, wherein the determining comprises:
determining a type of the content item associated with the content item based on the type-based custom attribute; and
determining the one or more behaviors configured for the type of the content item.

12. The system of claim 8, wherein the type-based custom attribute is mapped to one or more behaviors, and wherein the one or more behaviors comprise one or more custom behaviors that are different from a predefined behavior associated with the content item, the predefined behavior being based on at least one of the file extension associated with the content item, a type of the content item associated with the content item, and the application associated with the file extension.

13. The system of claim 12, wherein the one or more behaviors comprise at least one of prompting for the password prior to providing access to a content of the content item, restricting a content item operation, allowing the content item operation, displaying an icon for the content item, modifying a menu associated with the content item, redirecting the user account to a destination, allowing or restricting a move operation, allowing or restricting a renaming operation, allowing or restricting a modify operation, a synchronization behavior, and displaying an interface when the content item is invoked.

14. The system of claim 8, wherein the tree data structure is a representation of a remote state of the content item that comprises a data structure that logs content item revisions implemented at the content management system.

15. A non-transitory computer-readable medium comprising instructions that, when executed by one or more processors, cause the one or more processors to:

receive, from a user account registered with a content management system, a request to access a content item managed by the content management system for the user account, wherein revisions to the content item are logged;

determine that the content item is associated with a type-based custom attribute that is stored as respective node metadata of a tree data structure at the content management system that indicates to the content management system that if the content item is a certain type of content item then it is a password-protected encrypted content item;

based on the respective node metadata from the content item, handle the content item as the password-protected encrypted content item that can be decrypted by an application associated with the content management system when a password is provided;

in response to a receipt of authentication of the password, initiate a decryption procedure; and in response to a successful decryption of the content item, opening the decrypted content item based on instructions from the type-based custom attribute without depending on a file extension associated with the decrypted content item.

16. The method of claim 1, further comprising: identifying the tree data structure associated with the user account that is obtained from a representation of a remote state stored at a client device.

17. The method of claim 16, wherein the respective node metadata specifies at least one event that triggers actions to apply to the content items associated with the user account and the client device.

18. The method of claim 1, wherein the respective node metadata includes one or more actions that applies to the content item and at least one event that triggers the actions to be applied to the content item upon being triggered at an occurrence of the at least one event.

19. The method of claim 1, wherein the tree data structure is a representation of a remote state of the content items associated with the user account comprises a remote tree data structure stored at a client device, wherein the remote tree data structure comprises nodes corresponding to the content items associated with the user account, each node identifying a current state at the content management system of an associated content item stored at the content management system.

* * * * *